(12) United States Patent
Powell

(10) Patent No.: US 10,173,791 B2
(45) Date of Patent: Jan. 8, 2019

(54) SYSTEM AND METHOD FOR MAGNETICALLY LAUNCHING PROJECTILES OR SPACECRAFT

(71) Applicant: James R. Powell, Shoreham, NY (US)

(72) Inventor: James R. Powell, Shoreham, NY (US)

(*) Notice: Subject to any disclaimer, the term of this patent is extended or adjusted under 35 U.S.C. 154(b) by 455 days.

(21) Appl. No.: 15/093,596

(22) Filed: Apr. 7, 2016

(65) Prior Publication Data

US 2016/0297548 A1 Oct. 13, 2016

Related U.S. Application Data

(60) Provisional application No. 62/146,141, filed on Apr. 10, 2015.

(51) Int. Cl.
*B64G 1/00* (2006.01)
*B64G 5/00* (2006.01)
*F41B 6/00* (2006.01)

(52) U.S. Cl.
CPC ............... *B64G 1/002* (2013.01); *B64G 5/00* (2013.01); *F41B 6/006* (2013.01)

(58) Field of Classification Search
CPC ............ B64G 1/002; B64G 5/00; F41B 6/006
USPC ..................................... 124/3; 89/8
See application file for complete search history.

(56) References Cited

U.S. PATENT DOCUMENTS

| | | | | |
|---|---|---|---|---|
| 4,347,463 A | * | 8/1982 | Kemeny | F41B 6/006 124/3 |
| 4,449,441 A | * | 5/1984 | McAllister | F41B 6/006 124/3 |
| 4,457,205 A | * | 7/1984 | Ross | F41B 6/006 124/3 |
| 4,795,113 A | * | 1/1989 | Minovitch | B64G 1/14 104/138.1 |
| 7,444,919 B1 | * | 11/2008 | Mansfield | F41B 6/003 89/8 |
| 2008/0053299 A1 | * | 3/2008 | Taylor | F41B 6/006 89/8 |
| 2016/0290758 A1 | * | 10/2016 | Sierra Izquierdo | F41B 6/006 |
| 2016/0297548 A1 | * | 10/2016 | Powell | B64G 1/002 |

* cited by examiner

*Primary Examiner* — Samir Abdosh
(74) *Attorney, Agent, or Firm* — Fulwider Patton LLP

(57) ABSTRACT

A system and method for magnetically launching projectiles or spacecraft includes an electromagnetic launcher including a launch tube, and a launch craft. The launch tube includes electrically conducting rails energized along the length of the rails, and a transverse direct current magnetic field is generated along the launch tube, and upper and lower conductors and loops of conducting material on the launch craft are provided for magnetic levitation, stabilization and propulsion of the launch craft in cooperation with the transverse direct current magnetic field. A transverse direct current magnetic field is applied to the launch tube and the launch craft during launching of the launch craft, and the launch craft is magnetically levitated and stabilized to minimize contact between the launch craft and the launch tube as the launch craft travels within the launch tube.

39 Claims, 14 Drawing Sheets

SYSTEM AND METHOD FOR MAGNETICALLY LAUNCHING PROJECTILES OR SPACECRAFT

CROSS-REFERENCES TO RELATED APPLICATIONS

This application is based upon and claims priority from U.S. Provisional Patent Application No. 62/146,141, filed Apr. 10, 2015, which is incorporated by reference herein in its entirety.

BACKGROUND

This application relates generally to a system and method for electromagnetically launching payloads such as projectiles, launch vehicles, spacecraft, aircraft, missiles, rockets, or the like, and more particularly relates to an electromagnetic launcher, an electromagnetic launch system and a method for electromagnetically launching such payloads that utilizes magnetic levitation, stabilization and propulsion, employing a transverse direct current magnetic field generated in superconducting cables extending along a launch tube.

Electromagnetic launch systems typically are capable of accelerating payloads such as projectiles, launch vehicles, spacecraft, aircraft, missiles or rockets, for example, to high velocities. Electromagnetic launching of such payloads has the major advantage of minimizing or even eliminating the need to carry fuel and rocket motors for propulsion and stabilization of the payloads, as is particularly the case with missiles and rockets. Launching projectiles electromagnetically can also achieve much higher muzzle velocities for the projectiles than is possible with other conventional methods, such as artillery.

One prior art electromagnetically energized railgun system is known that utilizes nesting and segmenting of primary rails in combination with augmenting rails and crossover bar conductors, and an inductorless single power supply arrangement. The railgun system includes a launch tube containing two or more electrically conducting rails along which a projectile-carrying sabot slides. Acceleration force is generated when a current is passed up through one rail, through an armature, which physically contacts the rail, and down another rail, creating a magnetic pressure that pushes the sabot along the launch tube. However, such railgun systems typically have a maximum practical launch velocity achievable with railguns and is on the order of 3 kilometers per second, which constrains the range of projectiles launched on earth to only a few hundred miles, and is far below the velocity needed to achieve orbit for a payloads, which is on the order of 8 kilometers per second. Furthermore, because railguns commonly require that an armature physically contact the rails, the rails must be replaced on a regular basis due to the extreme mechanical stresses and erosion present with this technology.

A conventional coil gun is also known that utilizes an electromagnetic projectile accelerator including stationary coils aligned along an axis of a launch tube for acceleration of a magnetic projectile down the launch tube, by sequentially energizing each individual coil as the projectile approaches to electromagnetically pull or push the projectile along the launch tube. While projectiles launched by such coil guns need not contact any rails on the inside of the launch tube, as is the case with railguns, such coil guns also have a limited maximum practical velocity, due to the need to sequentially and precisely switch large currents through the series of coils on short (sub-microsecond) time scales. This constraint limits the maximum practical velocities and masses of the launched projectiles.

A space tram (Powell and Maise, 2001, U.S. Pat. No. 6,311,926 B1) for launching a spacecraft from earth into outer space is also known that utilizes a launch tube that is magnetically suspended, with an inlet on earth and an elevated outlet. The spacecraft includes superconducting loops, and when the launch tube is evacuated, the payload is propelled through the launch tube by magnetic levitation to achieve escape velocity for reaching outer space, due to magnetic interaction between the superconducting loops on the spacecraft and an alternating current (AC) wave flowing in non-superconducting, normal metal loops embedded in walls of the launch tube.

While such magnetic levitation or maglev launch systems based on the magnetic acceleration of spacecraft equipped with superconducting loops can achieve orbital speeds of 8 kilometers per second or greater with potentially much lower launch costs than rockets, such conventional maglev launch systems are difficult to scale down to smaller systems such as those optimized for launching small satellites on the order of 100 kilograms, and typically requires specialized power conditioning equipment to generate the necessary AC current required to accelerate the vehicle. While such magnetic levitation systems can potentially be used for launch systems with launch tubes less than 50 km long providing moderate accelerations of less than 500 m s$^2$ (50 g), such magnetic levitation systems are typically prohibitively expensive for shorter launch systems necessarily requiring higher accelerations, and typically require that spacecraft launched in this manner to have sufficient superconductor cables to carry large currents (500,000 to 1,000,000 amps), which can be prohibitively costly for the launch of small payloads on the order of 100 kg.

Furthermore, such maglev launch systems that use high current superconducting loops on the payload being launched typically require a complex travelling AC current wave in the rails on the walls of the launch tube that pushes on the superconducting magnets on the payload to accelerate the payload. The frequency of the AC power wave must be finely adjusted and controlled using DC to AC inverters to increase its frequency as the velocity of the payload being launched increases. In addition, only a short section of the launch tube where the payload being launched moves along the launch tube can be energized. As the payload being launched moves along the launch tube, the travelling AC power wave is switched off from the presently energized section that the payload is leaving, and is switched onto the next section into which the payload is moving.

It would therefore be desirable to provide an electromagnetic launcher and a system and method for electromagnetically launching a payload such as a projectile, launch vehicle, spacecraft, aircraft, missile, rocket, or the like, that involves no confining mechanical contact and friction of the payload with a launch tube wall, to allow launching many such payloads at extremely high velocity without damage to the launch tube wall or the payloads being launched.

It would also be desirable to provide such an electromagnetic launch system and method that does not require high current superconducting loops on such a payload, in order to greatly simplify and reduce costs of the design and manufacture of the projectile, launch vehicle, spacecraft, aircraft, missile, rocket, or other similar payload to be launched, and allowing the launching of much smaller and lighter such payloads than is possible with conventional maglev launch systems.

It would also be desirable to provide such an electromagnetic launch system and method in which the power conditioning system required for accelerating such payloads is much simpler and less costly than power conditioning systems required for maglev launch systems that use high current superconducting loops on the projectile or launch vehicle.

It would also be desirable to provide such an electromagnetic launch system and method that utilizes a simple DC current stationary power source, with the current flowing from DC rails mounted to an interior tube wall through a moving payload to be launched. It would also be desirable to provide such an electromagnetic launch system and method in which the complete length of the DC rails along the launch tube is energized with the DC current that flows into the payload being launched across small gaps between the rails and the payload being launched via plasma arcs or via conducting brushes, for example, eliminating the requirement for expensive, complex electronic switches to control the frequency and activation location of the current needed by other maglev launch systems that employ superconducting loops on the payload being launched and a traveling AC current wave. The present invention meets these and other needs.

SUMMARY OF THE INVENTION

Briefly, and in general terms, the present invention provides for an electromagnetic launcher, an electromagnetic launch system and a method for electromagnetically launching a launch craft for carrying payloads such as projectiles, launch vehicles, spacecraft, aircraft, missiles, rockets, or the like, that utilizes magnetic levitation, stabilization and propulsion, and that employs a transverse direct current magnetic field generated in superconducting cables extending along a launch tube to eliminate mechanical contact and friction of the payload with a launch tube wall. Upper and lower conducting metal plates and loops of conducting material are also provided on the launch craft for magnetic levitation, stabilization and propulsion of the launch craft in cooperation with the transverse direct current magnetic field provided by the electromagnetic launcher to be simpler and less costly, allowing power conditioning to be simplified and less costly, and the electromagnetic launcher includes a launch tube with electrically conducting rails energized along the length of the rails, allowing elimination of expensive, complex electronic switching.

Accordingly, the present invention provides for an electromagnetic launcher, including a launch tube of predetermined geometry through which a launch craft may travel, a plurality of electrically conducting rails mounted to the inside walls of the launch tube, and a means for applying a transverse direct current magnetic field to the launch tube and its contents. The present invention also provides for a means for magnetically levitating and stabilizing the launch craft to minimize contact between the launch craft and the launch tube as the launch craft travels within the launch tube, and provides for a means for transmitting an electrical current passed from one of the rails across the launch craft to another of the rails in the presence of the magnetic field, whereby the launch craft is accelerated inside the launch tube.

In one presently preferred aspect, the means for applying a transverse direct current magnetic field includes a plurality of electrically conducting cables arranged in an assembly flanking the launch tube. In another present preferred aspect, the launch tube has a square cross section with four electrically conducting rails mounted along each interior corner edge of the launch tube. In another present preferred aspect, the rails consist of two pairs of non-connected rails whereby each pair consists of a positive rail connected to a positive terminal of a current source and a negative rail connected to the negative terminal of the current source.

In another presently preferred aspect, the means of applying a transverse direct current magnetic field includes a plurality of electrically conducting cables embedded within the walls of the launch tube. In another present preferred aspect, the launch tube has a square cross section with a pair of electrically conducting rails embedded within the top wall of the launch tube and a second pair of electrically conducting rails embedded within the bottom wall of the launch tube. In another present preferred aspect, each rail pair extends the length of the launch tube and is placed along the centerline of one of walls that form the launch tube. In another present preferred aspect, each rail pair consists of one positively charged rail and one negatively charged rail of normal metal conductor which are placed closely together yet are still electrically insulated from each other. In another preferred aspect, unconnected finger extensions extend laterally from the side of each rail towards the inside edge of the square launch tube such that current flows from the positively charged rail through a subset of finger extensions then through the launch craft before passing into a subset of finger extensions of the negatively charged rail.

In another present preferred aspect, the means for magnetically levitating and stabilizing the launch craft includes the use of a plurality of closed conducting loops in a predetermined geometry on integrated into the surfaces of the launch craft that magnetically interact with current flowing in the rails to vertically levitate and stabilize the launch craft in a desired position as it travels down the launch tube. In another present preferred aspect, the closed conducting loops include a pair of superconducting planar loops integrated into surfaces on opposite sides of the launch craft. In another present preferred aspect, the means for magnetically levitating and stabilizing the launch craft includes the use of closed conducting loops in a predetermined geometry on a plurality of surfaces of the launch craft that magnetically interact with current flowing in the rails to laterally stabilize the launch craft in a desired position as it travels down the launch tube. In another present preferred aspect, the closed conducting loops include a pair of superconducting loops formed into a figure of 8 geometry and integrated into surfaces on opposite sides of the launch craft.

In another present preferred aspect, the means for magnetically levitating and stabilizing the launch craft includes the use of a plurality of superconducting loops integrated into the walls of the launch tube. In another present preferred aspect, the means for magnetically levitating and vertically stabilizing the launch craft includes the use of a plurality of closed conducting loops in a predetermined geometry on integrated into the surfaces of the launch craft that magnetically interact with the superconducting loops. In another present preferred aspect, the closed conducting loops on the launch craft include a simple planar loop embedded in a horizontal plane running through the body of the launch craft. In another present preferred aspect, the means for horizontally stabilizing the launch craft includes the use of a plurality of closed conducting loops in a predetermined geometry on integrated into the surfaces of the launch craft that magnetically interact with the superconducting loops. In another present preferred aspect, the closed conducting loops on the launch craft include two interconnected planar loops integrated into opposite surfaces of the launch craft.

In another present preferred aspect, the means of magnetically levitating and vertically stabilizing the launch craft includes a current conducting path formed by a rail pair embedded in the top or bottom wall of the launch tube, the segmented finger extensions extending from each rail in the rail pair, the plasma arc spanning from the tips of the finger extensions, and the metal thruster plate or thruster cables integrated into the body of the launch craft. In another preferred aspect, the means of magnetically stabilizing the launch craft laterally within the launch tube includes the use of closed conducting loops of a predetermined geometry integrated into opposite lateral sides of the launch craft that are interconnected by a crossover extension.

In another present preferred aspect, the means for transmitting an electrical current includes conducting plates integrated into the body of the launch craft, which provide part of a current path from a positively charged rail to a negatively charged rail. In another present preferred aspect, the means for transmitting an electrical current includes conducting wires integrated into the body of the launch craft, which provide part of a current path from a positively charged rail to a negatively charged rail. In another present preferred aspect, the means for transmitting an electrical current includes the formation of a plasma arc between the rails and the launch craft, whereby current flows between the rails and the launch craft. In another present preferred aspect, the means for transmitting an electrical current includes flexible conducting brushes attached to the launch craft which directly contact the rails, whereby current flows between the rails and the launch craft. In another present preferred aspect, the means for transmitting an electrical current includes flexible conducting brushes attached to the rails which directly contact the launch craft, whereby current flows between the rails and the launch craft.

The present invention also provides for system for electromagnetically launching a launch craft, including a launch tube having launch tube walls, a plurality of electrically conducting rails mounted along a length of the launch tube walls, and a plurality of electrically superconducting loops arranged in an assembly flanking the launch tube and configured to apply a transverse direct current magnetic field to the launch tube and contents of the launch tube. A launch craft is also provided that is configured to be removably received in the launch tube. The launch craft includes a sabot for carrying a payload, and a plurality of conductors are located on the sabot that preferably are configured to provide at least a portion of a current path from a positively charged one of the plurality of rails to a negatively charged one of the plurality of rails to transmit electrical current across the sabot in the presence of the transverse direct current magnetic field to accelerate the launch craft inside the launch tube. A plurality of closed conducting loops preferably also are located in a predetermined geometry on the sabot, and the plurality of loops of conducting material preferably are configured to interact with current in the plurality of electrically conducting rails to magnetically levitate and vertically stabilize the launch craft to minimize contact between the launch craft and the launch tube as the launch craft travels within the launch tube.

In a presently preferred aspect, the sabot includes a parting line along which the sabot can separate from the payload for launching the payload. In another presently preferred aspect, the plurality of conductors located on the sabot includes a pair of upper and lower conducting metal plates. In another presently preferred aspect, the plurality of closed conducting loops includes conducting loops located on left and right sides of the sabot. In another presently preferred aspect, the plurality of closed conducting loops includes upper and lower figure of 8 conducting loops. In another presently preferred aspect, the plurality of closed conducting loops includes two interconnected planar loops integrated into opposite surfaces of the sabot. In another presently preferred aspect, the plurality of conductors includes a plurality of flexible conducting brushes attached to the sabot and configured to directly contact the rails for carrying current between the rails and the launch craft. In another presently preferred aspect, the plurality of conductors includes a plurality of flexible conducting brushes attached to the rails and configured to directly contact the rails for carrying current between the rails and the launch craft.

The present invention also provides for a method for electromagnetically launching a launch craft, including the steps of providing a launch tube having launch tube walls, a plurality of electrically conducting rails mounted along a length of the launch tube walls, and a plurality of electrically superconducting loops arranged in an assembly flanking the launch tube that are configured to apply a transverse direct current magnetic field to the launch tube and contents of the launch tube. A launch craft including a sabot for carrying a payload is also provided that is configured to be removably received in the launch tube. A plurality of conductors located on the sabot preferably are provided that are configured to form at least a portion of a current path from a positively charged one of the plurality of rails to a negatively charged one of the plurality of rails to transmit an electrical current across the sabot in the presence of the transverse direct current magnetic field to accelerate the launch craft inside the launch tube. A plurality of closed conducting loops also are provided in a predetermined geometry on the sabot, and the plurality of loops of conducting material preferably are configured to interact with current in the plurality of electrically conducting rails to magnetically levitate and vertically stabilize the launch craft to minimize contact between the launch craft and the launch tube as the launch craft travels within the launch tube. A transverse direct current magnetic field is applied to the launch tube and the launch craft during launching of the launch craft, and the launch craft is magnetically levitated and stabilized to minimize contact between the launch craft and the launch tube as the launch craft travels within the launch tube, and the electrical current is transmitted to conducting plates integrated into the launch craft to provide part of a current path from a positively charged rail to a negatively charged rail.

In a presently preferred aspect, the step of applying a transverse direct current magnetic field includes applying the transverse direct current magnetic field by a plurality of electrically conducting cables arranged in an assembly flanking the launch tube. In another presently preferred aspect, the step of applying a transverse direct current magnetic field includes magnetically levitating and stabilizing the launch craft to minimize contact between the launch craft and the launch tube as the launch craft travels within the launch tube. In another presently preferred aspect, the step of magnetically levitating and stabilizing the launch craft involves magnetically levitating and stabilizing the launch craft by a plurality of closed conducting loops arranged in a predetermined geometry on integrated into the surfaces of the sabot that magnetically interact with the superconducting loops. In another presently preferred aspect, the step of transmitting the electrical current involves transmitting the electrical current in the presence of the magnetic field to accelerate the launch craft inside the launch tube. In another presently preferred aspect, the step of transmitting the electrical current involves transmitting the electrical current to conducting wires integrated into the launch craft to provide part of a current path from a positively charged rail to a negatively charged rail. In another presently preferred aspect, the step of transmitting the electrical current involves transmitting the electrical current via a plasma arc between the rails and the launch craft. In another presently preferred aspect, the step of transmitting the electrical current involves transmitting the electrical current to flexible conducting brushes attached to the launch craft to provide part of a current path from a positively charged rail to a negatively charged rail. In another presently preferred aspect, the step of transmitting the electrical current involves transmitting the electrical current to flexible conducting brushes attached to the rails which directly contact the launch craft to provide part of the current path from a positively charged rail to a negatively charged rail.

Because of the strong transverse DC magnetic field, the launch craft can accelerate at much greater g levels than is possible using superconducting loops and a traveling AC current wave. For example, the launch craft can accelerate at 3000 g or more, compared to a maximum capability of about 100 g for maglev systems that use high current superconducting loops on the launch craft. The much higher accelerations seen in the present invention results in much shorter launch tubes. For example, launch velocities of 8 kilometers per second can be achieved with a 3000 g, 1 kilometer-long system, compared to a 30 g, 100 kilometer-long Startram system.

The use of a strong transverse DC magnetic field enables acceleration of the launch craft using much smaller pulsed currents than required for railguns. As an example, a system with a 5 Tesla transverse magnetic field and a current of 1 million amps flowing through a sabot enclosing a projectile or launch vehicle would have an acceleration force of 5 million Newtons per meter of sabot cross-sectional width. A 100 kilogram launch craft, enclosing either a projectile or a launch vehicle, with a sabot width of 0.55 meters, would accelerate at 2700 g, reaching a velocity of 4 kilometers per second in only 300 meters and an orbital speed of 8 kilometers per second in only 1.2 kilometers. Railguns, by comparison, must operate with much greater pulsed currents, up to 5 to 6 million amps.

The very high energy efficiency and very low heating rate exhibited in one embodiment enables it to launch many satellites, with short intervals between launches. For example. A launch system could easily launch 10 micro/nano satellites per day, each with a launch mass on the order of 100 kg. Based on a 30% efficient transfer of power from a conventional power source to the pulsed DC current supply, the time-average electric power requirements to the DC energy storage system would then be 1.2 megawatts. The energy cost for launching 100 kg launch craft would be only $300, a trivial amount.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1A shows a cut-away perspective view. FIG. 1B shows a side view. FIG. 1C shows a top view.

FIG. 7A shows a cut-away perspective view. FIG. 7B shows a side view. FIG. 7C shows a top view.

DETAILED DESCRIPTION OF THE PREFERRED EMBODIMENTS

Figure 1A:
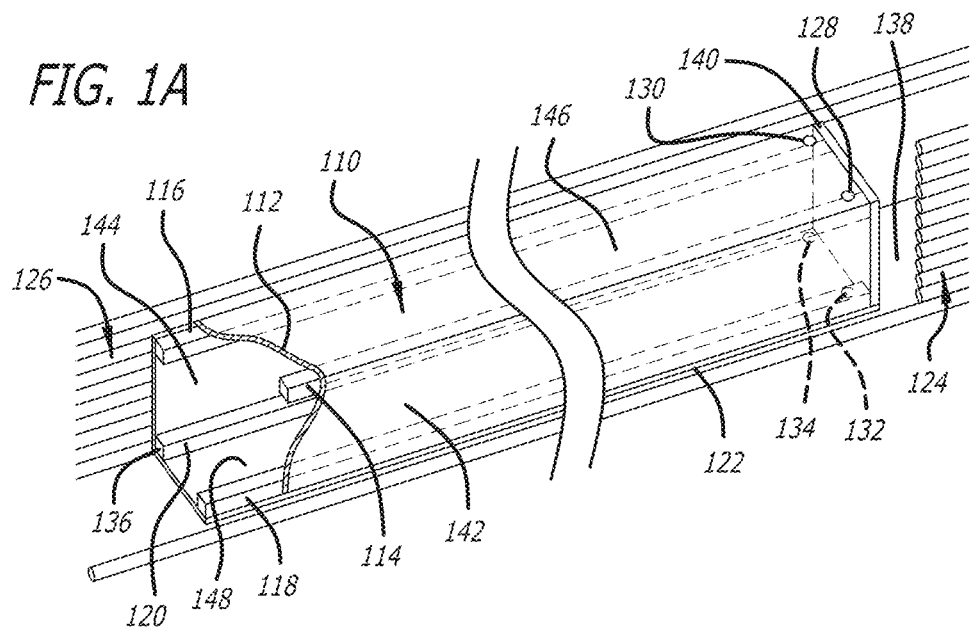
FIGS. 1A to 1C show different views of a launch tube and superconducting cable assemblies in accordance with one embodiment.

In one presently preferred embodiment, the electromagnetic launch system includes a launch tube 110 and launch craft 210, as illustrated in FIGS. 1A-C and 2A-E, respectively. As used herein, the term "launch craft" is defined as a launch vehicle configured to be propelled from within a launch tube and configured to carry one or more payloads such as projectiles, other launch vehicles, spacecraft, aircraft, missiles, rockets, or other similar suitable payloads that can be launched, and the like, and that typically is configured to separate from the one or more payloads to be launched after the launch craft exits the launch tube.

Launch tube 110 has a square cross-section, with a launch tube wall 112 constructed of polymer concrete, non-conducting polymer, or other material that is both non-conducting and sufficiently strong for the intended use. Additionally, launch tube 110 can be closed at both ends to enable the air inside it to be removed. The exit end 136 of launch tube 110 could covered by a thin polymer membrane or a mechanical hatch or shutter, or other means for preventing air from entering the launch tube.

In one embodiment, conducting rails 114, 116, 118, and 120 are partially embedded in the launch tube walls to securely immobilize the rails during the launch process. The rails are made of copper or aluminum, or other material capable of carrying a predetermined current amperage. Rails 114, 116, 118, and 120 are placed so they run the length of launch tube 110 along its inside corners. In one embodiment, launch tube 110 is shown as a square tube with four rails 114, 116, 118, and 120 at the corners. However, other tube geometries such as circular, triangular, or otherwise are possible. Variations are also possible in the number and placement of the current-conducting rails.

In one embodiment, flanking the sides of launch tube 110 are the left and right sides of a superconducting loop assembly 124, 126, which includes a plurality of superconducting cables 122. Each cable 122 within assembly 124, 126 is arranged to form a dipole loop. The left and right sides of loop assembly 124, 126 that flank launch tube 110 are of sufficient length and height to exceed the entire length and height of launch tube 110 to a sufficient degree to generate transverse magnetic direct current field of a predetermined uniformity.

Figure 1B:
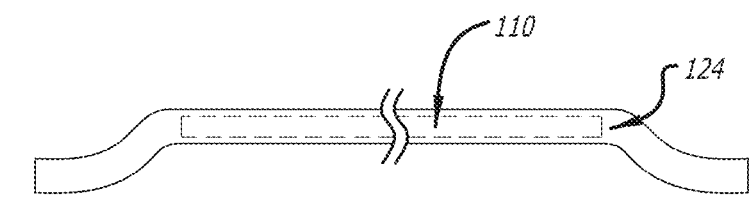
Figure 1C:
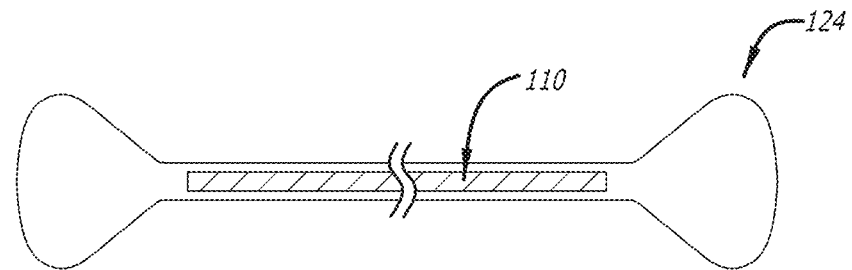
Figure 2A:
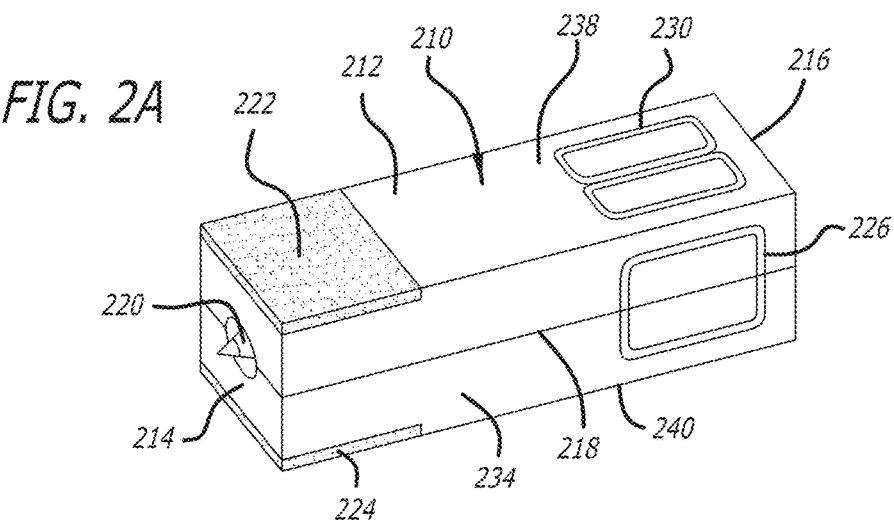
FIGS. 2A to 2E show views of a launch craft in accordance with one embodiment.
Figure 2B:
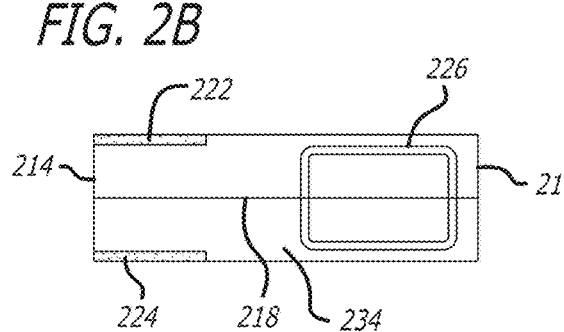
Figure 2C:
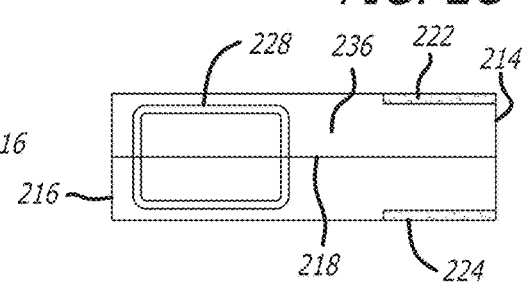
Figure 2D:
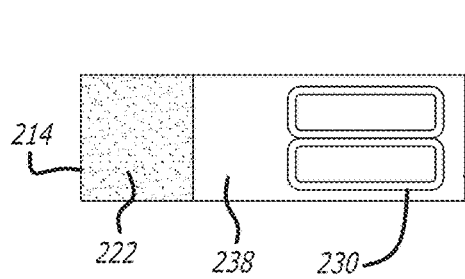
Figure 2E:
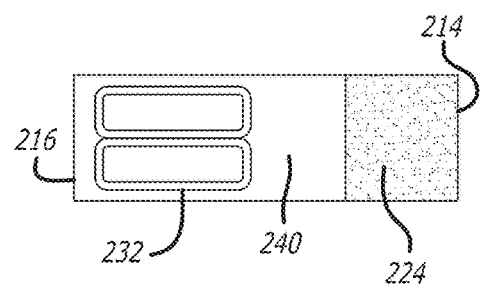

The electromagnetic launch system is not limited to the embodiment shown in FIGS. 1A-C. The super conducting loop assembly 124, 126 can be constructed so that other direct current magnetic field geometries can be used, such as a quadrupole field or a sextapole field or other geometries.

In one embodiment, current is supplied to upper left rail 114 and lower left rail 118 via positive electric terminals 128 and 132, respectively, from an external energy storage device capable of supplying direct current electric power to the rails. Upper right rail 116 and lower right rail 120 are connected to the ground of the external energy storage device by negative electric terminals 130 and 134, respectively. The external energy storage device could consist of one or more batteries, a pulsed alternator, a superconducting magnetic energy storage system, or some other similar suitable means. Current may also be separately supplied to rails 114 and 118 by a plurality of energy storage devices. Both the positive electric terminals 128 and 132 and the negative electrical terminals 130 and 134 are shown as connected to the starting end 138 of launch tube 110, though it is also possible, in other embodiments, for the electrical terminals to be located at the exit end 136 of launch tube 110.

As illustrated in FIGS. 2A-E, launch craft 210 of one embodiment includes a sabot 212 which encloses a projectile 220. Projectile 220 can also be designed to contain a small rocket motor and spacecraft for transporting payloads into orbit. Sabot also is preferably configured to be at least partially frangible, and contains a parting line or fracture line 218, along which the sabot can separate from projectile 220 or other payload for launching the projectile or other payload after launch craft 210 exits launch tube 110.

In one presently preferred aspect, sabot 212 has a square cross section that is 60 centimeters on a side and is of a pre-determined length sufficient to enclose projectile 220. Embedded into and flush with the top and bottom sides of sabot 212 are conducting metal plates 222 and 224, respectively, each of which can be made of ordinary conducting metal such as aluminum or copper, or some other similar suitable conducting material. In one presently preferred aspect, plates 222 and 224 each typically are 60 centimeter in width (thus spanning the width of sabot 212), 30 cm in length along the long axis of the sabot, and are 1 cm thick, though other dimensions for plates 222 and 224 are possible. The conducting metal surfaces of the lateral ends of each conducting plate are exposed so that current may flow from one rail across the plate to another rail. In this embodiment, the conducting plates are ideally located in the forward half of launch craft 210, though other embodiments are possible. As an alternative to conducting plates 222 and 224 shown in FIGS. 2A-E, conducting wires on or embedded into sabot 212 may also be used to carry current from one rail to another. While launch craft 210 is shown in FIGS. 2A-E with a square cross section, other shapes are also possible, including circular, elliptical, rectangular, and the like.

In one embodiment, launch craft 210 also includes conducting loops 226 and 228 located on the left and right sides of the craft, respectively. Loops 226 and 228 are used for launch craft levitation and vertical stabilization. Loops 226 and 228 are located aft of the conducting plates 222 and 224. The conducting loops 226 and 228 in this embodiment are made of a superconducting material, though ordinary metal conducting loops of a predetermined cross-sectional area are also possible. The conducting loops 226 and 228, in one embodiment, are each formed into a simple rounded rectangular geometry and embedded within or mounted to the sides of launch craft 210, although other geometries are possible.

Launch craft 210, in one embodiment, also includes conducting loops 230 and 232 located on the top and bottom sides 238 and 240 of the launch craft, respectively. Loops 230 and 232 are used for launch craft lateral stabilization. Loops 230 and 232 are located aft of the conducting plates 222 and 224. The conducting loops 230 and 232 in this embodiment preferably are made of a superconducting material, though ordinary metal conducting loops of a predetermined cross-sectional area are also possible. Conducting loops 230 and 232 preferably are each formed into in a simple figure of 8 shaped geometry and embedded within or mounted to the top and bottom of launch craft 210, although other geometries are possible.

Figure 3:
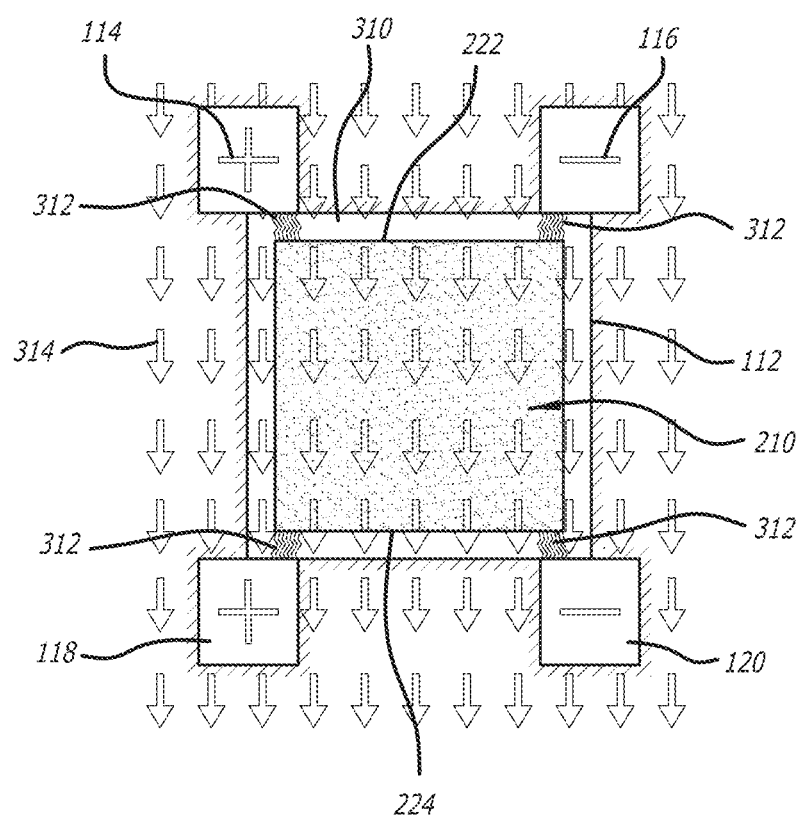
FIG. 3 shows a cross-section view of a launch craft within a launch tube immersed in an externally applied direct current magnetic field.
Figure 4A:
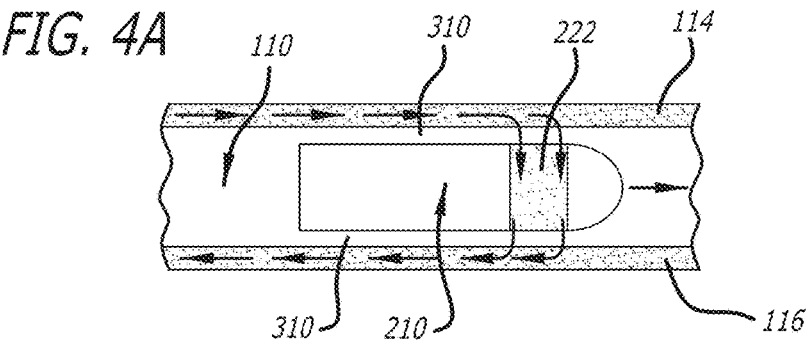
FIGS. 4A to 4E show current flowing along rails within a launch tube and various means to transmit current from rails to the conducting plate on a launch craft.
Figure 4B:
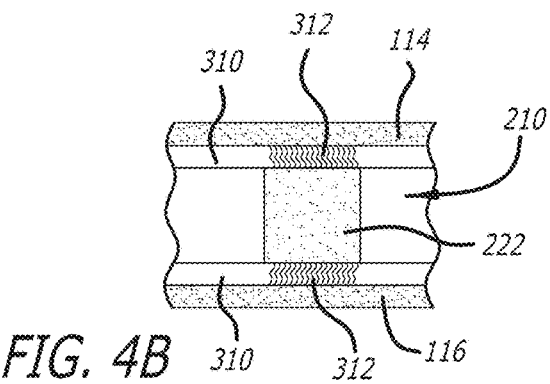
Figure 4C:
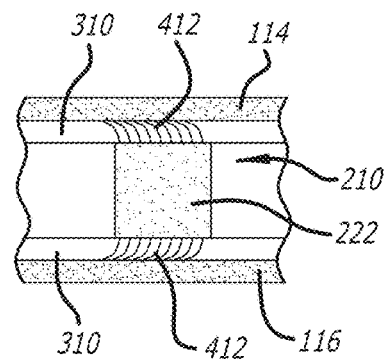
Figure 4D:
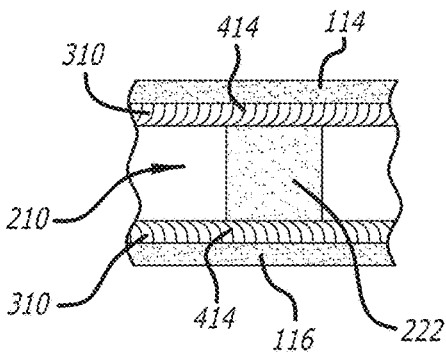
Figure 4E:
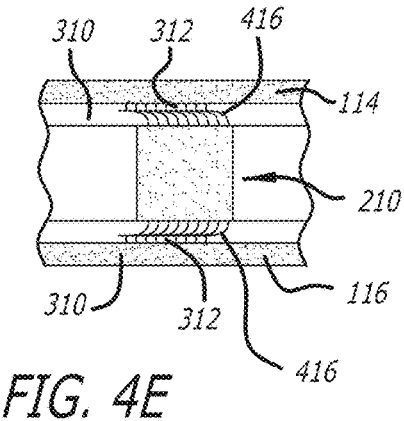

In one embodiment, as illustrated in FIG. 3, launch craft 210 is centered within launch tube 110 so that a 5 cm gap 310 is maintained between the launch craft 210 and launch tube wall 112. During operation, an electric arc 312 carries current across the gap between rails 114, 116, 118 and 120 and conducting plates 222 and 224. Furthermore, in its centered position, launch craft 210 is immersed within a transverse magnetic direct current field 314, the magnetic field lines of which are orthogonal to the longitudinal axis 148 of launch tube 110. The magnetic field lines of field 314 flow from the top of the launch tube to the bottom. The transverse magnetic direct current field 314 is generated by superconducting loop assembly 124, 126 flanking the side walls of the launch tube. Although FIG. 3 illustrates current flow from rails 114, 116, 118 and 120 to the conducting plates 222 and 224 by means of an electric arc, it is also possible, as seen in FIG. 4, to conduct current by means of conducting brushes 412 attached to sabot 212, which directly contact the rails, or by means of conducting brushes 414 attached to rails 114, 116, 118, and 120, which directly contact sabot 212, or by means of conducting brushes 416 on sabot 212, which do not directly contact the rails but instead narrow the gap between rail and conducting plates, and thereby aid in the formation of an electric arc.

First Embodiment Operation:

The Launch craft is accelerated along the launch tube by a Lorentz force generated by the interaction between the transverse direct current (DC) dipole magnetic field 314 and the current flowing through conducting plates 222 and 224 located on sabot 212.

The DC dipole magnetic field inside launch tube 110 is generated by superconducting (SC) loop assembly 124, 126. The SC cables present in assembly 124, 126 run along the left and right exterior sides of launch tube 110 and are connected together at a predetermined distance and position away from the start 138 and exit 136 ends of launch tube 110 to form a set of long loops that carry continuous, constant DC current. The left and right sides are connected at a sufficient distance from the ends of launch tube 110 so that the desired uniformity of field 314 is not affected.

In one embodiment, current flows through the right side SC cables of assembly 124, 126 in a direction from start 138 towards exit 136 of launch tube 110, and current flows through the left side SC cables of assembly 124, 126 in a direction from exit 136 towards beginning 138 of launch tube 110. Seen from above, current moves around the loops of assembly 124, 126 in a counter-clockwise direction. A transverse DC dipole magnetic field 314 is thereby generated by current flowing in assembly 124, 126. Magnetic field 314 is orthogonal to the long axis of launch tube 110, with field lines flowing down from top to bottom through the launch tube. The strength of DC dipole magnetic field 314 generated by the assembly 124, 126 is constant in time during the launch process, including before launch craft 210 is accelerated, while it is being accelerated, and after it exits the launch tube 110. Depending on design, the superconducting cable assembly can be modified so that transverse DC dipole magnetic field 314 varies in strength spatially along the length of the launch tube.

In one embodiment, as illustrated in the cross-sectional view of the launch tube 110 shown in FIG. 3, current flows from a current source down the upper left rail 114 (into the paper), across the upper conducting plate 222, and returns along rail 116 (out of the paper). The interaction of the current flowing in rails 114 and 116 and conducting plate 222 with the transverse DC dipole magnetic field 314 generates a magnetic force that accelerates launch craft 210 along launch tube 110 is in a given direction (into the paper). Similarly, current flows from a current source down the lower left rail 118 (into the paper), across the lower conducting plate 224, and returns along rail 120 (out of the paper). The interaction of the current flowing in rails 118 and 120 and conducting plate 224 with the transverse DC dipole magnetic field 314 generates a magnetic force that accelerates launch craft 210 along launch tube 110 is in a given direction (into the paper).

The arrangement shown in FIG. 3 is arbitrary. If the directions of the currents in the superconducting loop assembly 114 were reversed, for example, the transverse DC dipole magnetic field lines would flow upwards. Accordingly, current flows in rails 114, 116, 118 and 120 would be modified so that the generated magnetic force would act to push launch craft 210 towards exit 136 of launch tube 110. Furthermore, the orientation of the embodiment shown in FIGS. 1A-C can be rotated. Depending on design, the transverse magnetic field can be at any angle with respect to Earth's gravity vector.

The total force exerted on launch craft 210 is then $$F = 2I \times B \times W \quad \text{Eq. 1}$$

Where
I=DC Current in the top or bottom plate, Amp
B=Strength of dipole DC magnetic field, Tesla
W=Width of conducting plate or wires across the sabot, meters
For
I=500,000 Amps
B=5 Tesla
W=0.6 meters Thus, in the given example, the exerted force is F=2× 500,000 Amps×5 Tesla×0.6 meters, or 3.0 million Newtons (N). Applied to a 100 kg launch craft, the acceleration would be 3000 g.

Figure 5A:
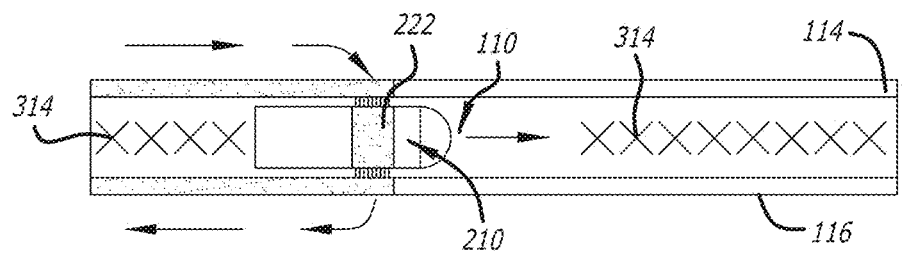
FIGS. 5A and 5B show current flow along rails and through the conducting plate at two time points in accordance with one embodiment.
Figure 5B:
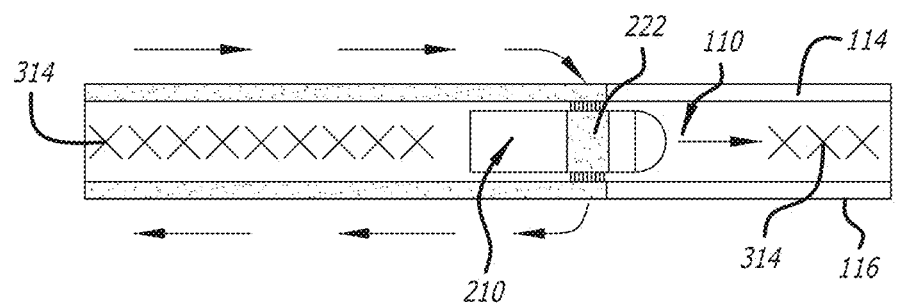

Transfer of Current Along and Between the Rails and Through the Launch Craft:

As shown in the schematic FIGS. 4 and 5, current only flows out of the DC rails at the location of the accelerating launch craft. Note that the rails illustrated in FIGS. 4 and 5 have been drawn as displaced laterally from their actual position so that the flow of current can be visualized. In actuality, current only flows vertically between rail and conducting plate (as shown in FIG. 3) so that the plasma arc is not affected by the transverse field. As launch craft 210 moves along the launch tube, the DC current flows only across into sabot 212, and not at other locations across the full width of the launch tube due to the presence of a high vacuum in launch tube 110. The presence of a high vacuum ensures a very high electrical resistance across the full width of launch tube 110, preventing the formation of an electrical arc that directly spans the rails.

At the points where DC current flows from rails into the sabot, the electrical resistance is low. There are a number of possible arrangements that enable large DC currents to flow from the DC rails into and out of the moving sabot. These possible arrangements include the four arrangements shown in FIG. 4.

1. DC plasma arcs between the DC rails and the sabot conducting plate.
2. Flexible conducting brushes 412 mounted to conducting plates 224 and 226 of sabot 212 conducting plate, which contact the DC rails.
3. Flexible conducting brushes 414 mounted to the DC rails that contact conducting plates of 224 and 226 of sabot 212.
4. DC plasma arcs between DC rails and flexible conducting brushes 416 mounted to conducting plates 222 and 224 on sabot 212.

Arrangement number 1 has the attractive feature that there is no mechanical contact between the rail and the sabot. Arrangement number 2 has the attractive feature that the conducting flexible brush on the sabot is only used once during the launch for a fraction of a second, and not for multiple launches. Arrangement number 4 has the attractive feature that there is no mechanical contact unless the sabot momentarily touches the DC rail due to a position anomaly (e.g., the displacement of a rail, etc.). In this event, the flexible conducting brush prevents any mechanical damage. In arrangement number 4, the plasma arc length is very small, less than 1 centimeter.

In one embodiment, the top rail pair, including rails 114 and 116, can operate independently of the bottom rail pair, including rails 118 and 120, with each pair connected to its own DC current power source. The DC current in the top pair can be controlled to be equal the DC current in the bottom pair, or different, depending on design. Alternatively, both rail pairs can be connected to the same power source.

The DC rails 114, 116, 118 and 120 run the full length of the launch tube 110. At the starting end 138 of the launch tube, the ends of 114, 116, 118 and 120 are connected to the DC current/power source via electrical terminals 128, 130, 132, and 134, respectively. At the exit end 136 of launch tube 110, the rails are not electrically connected together. The DC current in the rail pair then flows from the DC current/power source out along one rail to the accelerating launch craft 210, where it flows into the conducting plate or wires on the moving launch craft, and then out of the conducting plate or wires to the other rail of the pair, in which it flows back to the DC current/power source. When the DC rail current begins to flow through launch craft 210, the launch craft accelerates along the launch tube with the length of the DC rail current path increasing as the distance of the launch craft from the start point increases, as shown in FIG. 5.

If the supplied DC rail current comes from electrical terminals located at start 138 of launch tube 110, as is shown in FIGS. 1A-C, the conducting plates 222 and 224 on accelerating launch craft 210 would be located forward of the conducting loops 226, 228, 230, and 232. This enables loops 226, 228, 230, and 232 to interact with the currents in DC rails 114, 116, 118 and 120. If the DC rail current comes from electrical terminals located at exit 136 of the launch tube, loops 226, 228, 230, and 232 would be located aft of conducting plates 222 and 224.

One advantage of locating the DC current power sources and their connectors to the rail pairs at the starting end 138 of launch tube 110 is that the launch process results in a lateral outwards force applied to the rails, pressing them against the wall of the launch tube.

Energy Losses During the Launch Process:

During the launch process, the energy losses ("$I^2R$ losses") in the normal conductor DC rails 114,116, 118, and 120 are small compared to the kinetic energy imparted to the launch craft, and the corresponding temperature rise in the rails is very small. As an example, a 100 kg launch craft launched at 8 kilometers per second has a kinetic energy of 3200 megajoules. The $I^2R$ losses in one of the DC rails during the acceleration process are only 20 megajoules, for an 8 inch square (20 cm×20 cm) copper rail carrying 500,000 amps. Total $I^2R$ losses for the four DC rails shown in FIG. 3 would be 80 megajoules, only 2.5% of the 3200 megajoules kinetic energy of the 100 kg launch craft. The temperature rise in DC copper rails would also be very small. For the example described above, the average temperature rise in the 20 cm×20 cm DC copper rails carrying 500,000 amps for up to 0.26 second would be only 0.3 degrees centigrade. The $I^2R$ energy losses in the conducting plates 222 and 224 of the sabot 212 that transfer the current from the positively charged DC rails to the negatively charged rails are much smaller even than the $I^2R$ energy losses in the DC rails.

In one embodiment, as shown in FIGS. 1A-C, if the dimensions of the conducting plates 222 and 224 on the top and bottom, respectively, of the accelerating sabot are 1 cm thick by 60 cm width across the width of the sabot and 30 cm long in the direction of travel, and they are made of aluminum and carry 500,000 amps, the $I^2R$ loss for each plate is only 0.36 megajoules during the 0.26 second acceleration phase to 8 kilometers per second launch velocity. The total $I^2R$ energy loss for the two conducting plates is then 0.7 megajoules, about 1/5000th of the launch craft's kinetic energy at 8 kilometers per second. The corresponding temperature rise is greater in the conducting plates (80° C.) than in the DC rails (0.3° C.) because of their smaller cross-sections, e.g., 30 cm$^2$ compared to 400 cm$^2$ for the DC rails, but is acceptable. Increasing the plate thickness to 1.5 centimeters would reduce the temperature rise by a factor of (1.5)2, down to 35° C.

Levitation and Stabilization of Launch Craft:

In one embodiment, launch craft 210 is magnetically levitated as it is magnetically accelerated along launch tube 110 so that the launch craft does not contact the walls of the launch tube. The levitated launch craft is inherently and automatically stabilized, both vertically and laterally, to keep the craft at its equilibrium levitated position inside the launch tube. If an external force were to act on the launch craft, pushing it vertically or laterally away from its equilibrium levitated position, an automatic, inherent magnetic force will oppose the external force, preventing the launch craft from contacting the wall of the launch tube.

Figure 6:
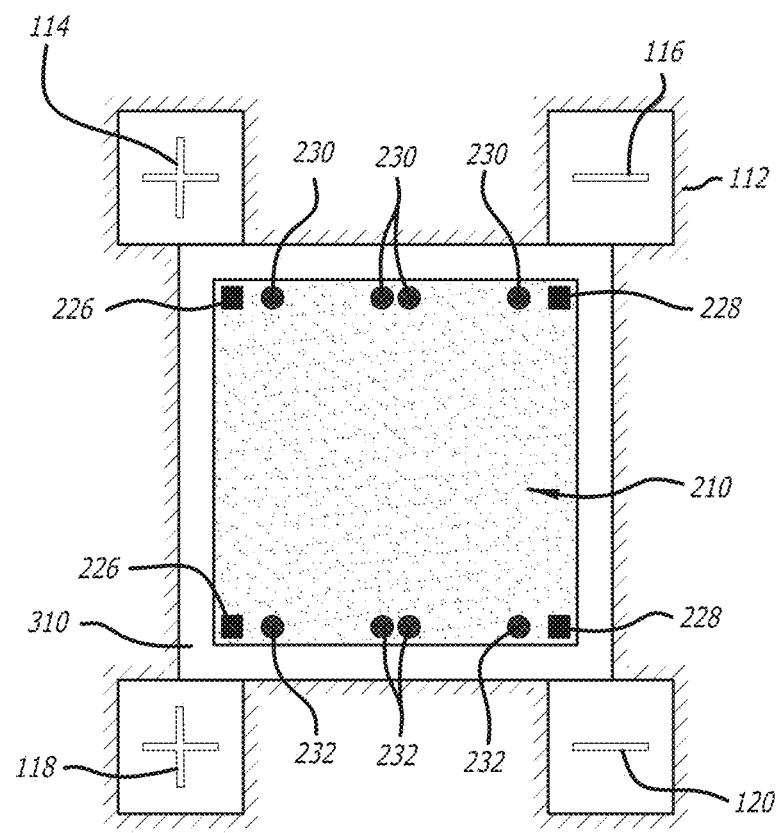
FIG. 6 shows a cross-sectional view of the position of horizontal and vertical stabilization loops on launch craft in accordance with one embodiment.

In one embodiment, the method for stabilizing the launch craft is illustrated in FIG. 6. Launch craft 210 has loops of conducting material 226, 228, 230 and 232 in which currents may be induced by the magnetic fields of the DC rails 114, 116, 118 and 120 if the launch craft deviates from the centered position in launch tube 110. When launch craft 210 is centered in the launch tube, the induced current in loops 226, 228, 230 and 232 is zero. The magnetic interactions between induced currents in the loops 226,228, 230 and 232 on launch craft and the DC rails 114, 116, 118 and 120 act to push the launch craft back towards its centered position.

Vertical Levitation and Stabilization:

In the embodiment illustrated in FIG. 6, the left dipole loop 226 and the right dipole loop 228 located on the left and right sides of launch craft 210, respectively, provide both levitation and vertical stability for the launch craft. When vertically centered between the upper DC rail pair (114 and 116) and the lower DC rail pair (118 and 120), the magnetic flux through dipole loops 226 and 228 is zero, and the induced current is zero. The magnetic flux from the background DC transverse magnetic field 314 is also zero because the transverse DC field direction is parallel to the plane of dipole loops 226 and 228.

If the launch craft moves upwards or downwards from its centered position in the launch tube, the net magnetic flux through dipole loops 226 and 228 from the DC rails pairs above and below the loops becomes non-zero, and current is induced in the loops. If launch craft 210 moves downwards, the magnetic flux through dipole loops 226 and 228 from the bottom DC rails 118 and 120 becomes greater than the oppositely directed magnetic flux from the top DC rails 114 and 116. The induced currents in dipole loops 226 and 228 then interact with the magnetic fields from the DC rails 114, 116, 118 and 120 to push the launch craft upwards. The bottoms of dipole loops 226 and 228 are pushed upwards by the repulsive force between the oppositely directed currents in the bottom DC rails 118 and 120 and the bottoms of dipole loops 226 and 228. The tops of dipole loops 226 and 228 are attracted upwards by the attractive force between the currents flowing in the same direction in the top DC rails 114 and 116 and the tops of dipole loops 226 and 228.

In one embodiment, the weight of the launch craft 210 pushes the launch craft downwards very slightly from its centered position, on the order of 1 millimeter, from its position where dipole loops 226 and 228 are exactly centered between the top and bottom DC rail pairs. The downward displacement generates enough current in dipole loops 226 and 228 that an upwards magnetic force is generated that equals the weight of the launch craft 210. During the acceleration phase of the launch process, launch craft 210 is accelerated along the launch tube 110 at a small vertical downwards displacement from the centered position.

Any displacement, up or down, of launch craft 210 from its equilibrium levitated position during the travel of the launch craft along the launch tube 110 instantly and inherently acts to push the launch craft back to its equilibrium position. The strength of the restoring force is proportional to and increases with the amount of displacement. For the example shown, when using 1 meter-long dipole loops, the restoring force is on the order of 20 g for a 100 kg launch craft that is displaced 1 cm up or down from its equilibrium levitation position. For the dipole loops 226 and 228 to contact a DC rail, a 5 cm displacement would be required and would result in a magnetic restoring force of well over 100 g.

The induced currents in loops 226 or 228 will experience magnetic forces by interacting with the transverse DC magnetic field. However, the net magnetic force acting on the launch craft from these interactions is zero. For example, if loop 226 or 228 is below its centered position in FIG. 6, the current in the conductor at the top of loops 226 or 228 will experience a laterally directed outwards magnetic force on the sabot towards the launch tube wall from its interaction with the transverse DC magnetic field, while the oppositely directed current at the bottom of loop 226 or 228 experiences an equal lateral inwards (away from the launch tube wall) force on the sabot. The net magnetic force exerted on launch craft 210 is zero for any vertical displacement.

The circuits of vertical dipole loops 226 and 228 do not experience magnetic inductions from the DC transverse magnetic field as the launch craft accelerates along the launch tube, because the planes of the loops 226 and 228 are parallel to the transverse DC magnetic field.

Lateral Stabilization:

In one embodiment, launch craft 210 is laterally stabilized by loops 230 and 232 shown in FIG. 6 at the top and bottom of the sabot. Loops 230 and 232 are "Figure of 8" loops. A "Figure of 8" loop is a loop in which two planar dipole loops are connected together into a circuit so that one planar dipole loop, e.g., the left loop of the pair, is wound clockwise, while the other loop is wound counterclockwise.

In their Figure of 8 configuration, loops 230 and 232 experience pulse of external magnetic field 314 in which the magnetic flux through the left loop is equal to the magnetic field pulse through the right loop, the net magnetic field pulse through the Figure of 8 loop circuit is zero, and no current will be induced in the circuit.

This zero net flux condition holds as long as loops 230 and 232 are centered horizontally between the DC rails. If loops 230 and 232 move leftwards of the center position, there is a non-zero net magnetic flux within the circuit of loops 230 and 232 circuit, from the DC rails inducing a current in loop. The current in the portion of loops 230 and 232 next to the left DC rail flows in a direction opposite to that in the DC rail. That produces a rightward directed magnetic force between the left DC rail and the current in loops 230 and 232 next to it, pushing the sabot rightwards, back towards its centered position.

Similarly, the current in the right DC rail magnetically interacts with the current in the right side of loops 230 and 232 next to it, which flows in the same direction as that in the DC rail, pulling the sabot rightwards back to its centered position.

If the launch craft is displaced rightwards from its centered position, the currents in loops 230 and 232 circuit flow in a direction opposite to that for a leftward displacement. The left DC rail and loops 230 and 232 current next to it magnetically interact to pull the sabot leftwards back towards the centered position, while the right DC rail and the loops 230 and 232 current next to it magnetically interact to push the sabot back towards its centered position. For the example shown in FIG. 6, the restoring force is on the order of 5 g per centimeter of displacement and 25 g for 5 centimeters, the distance between the sides of loops 230 and 232 circuit and the DC rails.

The figure-of-eight loops 230 and 232 also do not experience magnetic induction from the transverse DC magnetic field as launch craft 210 accelerates along launch tube 110. Prior to cooling loops 230 and 232 to superconducting temperatures in the launch tube, they are already immersed in the DC magnetic field 314. After loops 230 and 232 become superconducting, there is no current induced in them as the launch craft 210 accelerates along the launch tube 110, because they are always in the constant DC transverse magnetic field 314. Loops 230 and 232 only carry induced currents if they move laterally with respect to the centered position between the upper DC rails 114 and 116 and between the centered position between the lower DC rails 118 and 120.

Superconducting Loops on Launch Craft:

In the embodiment illustrated in FIG. 6, for launch craft 210 levitation and stability, loops 226, 228, 230, and 232 are composed of high temperature superconductors (HTS) instead of normal metal conductors, to prevent resistive decay of the currents induced in the loops by the lateral and vertical displacements. The use of superconductors for loops 226, 228, 230, and 232 is preferred for this embodiment to minimize non-payload mass within launch craft 210, however it is possible to use ordinary metal conductors to provide levitation and stability to the launch craft.

In one embodiment, the induced currents in the circuits of loops 226, 228, 230, and 232 are small, on the order of 10,000 amps, and can be carried in small amounts of superconductor compared with non-superconducting conductors. The superconductors would be cooled to superconducting temperatures just prior to launch using conventional liquid nitrogen coolant, with the superconductors remaining in the superconducting state during the launch period.

In an alternate embodiment, the electromagnetic launch system is similar to the embodiment already described, but differs in several key regards with respect to the composition of the launch tube, the launch craft, and also in the method of operation. The electromagnetic launch system preferably includes a launch tube 710 and launch craft 810, as illustrated in FIGS. 7A-C and 8A and B, respectively.

Launch tube 710 has a square cross-section, with a launch tube wall 712 constructed of polymer concrete, non-conducting polymer or other material that is both non-conducting and sufficiently strong for the intended use. Launch tube 710 can be closed at both ends to enable the air inside it to be removed. The exit end 736 of launch tube 710 could covered by a thin polymer membrane or a mechanical hatch or shutter, or other means for preventing air from entering the launch tube. The starting end 738 of launch tube 710 may be covered by a mechanical hatch or tube end covering 740, or shutter, or other means for preventing air from entering the launch tube.

Conducting rails 714, 716, 718, and 720 preferably are partially embedded in the launch tube walls to securely immobilize the rails during the launch process. The rails are made of copper or aluminum, or other material capable of carrying a predetermined current amperage. Rails 714,716, 718, and 720 are placed so they run the length of launch tube 710 along its inside corners. In another presently preferred aspect, launch tube 710 is shown as a square tube with four rails 714, 716,718, and 720 at the corners. However other tube geometries such as circular, triangular, or otherwise are possible, as are variations in the number and placement of the current-conducting rails.

Flanking the sides of launch tube 710 preferably are the left side 724 and right side 726 of a superconducting loop assembly, which includes a plurality of superconducting cables 722. Each cable 722 within assembly 724, 726 is arranged to form a dipole loop. The left and right sides of loop assembly 724, 726 that flank launch tube 710 are of sufficient length and height to exceed the entire length and height of launch tube 710 to a sufficient degree to generate transverse magnetic direct current field of a predetermined uniformity.

The electromagnetic launch system is not limited to the embodiment shown in FIG. 7. The super conducting loop assembly 724, 726 can be constructed so that other direct current magnetic field geometries can be used such as a quadrupole field or a sextapole field or other geometries.

Figure 7A:
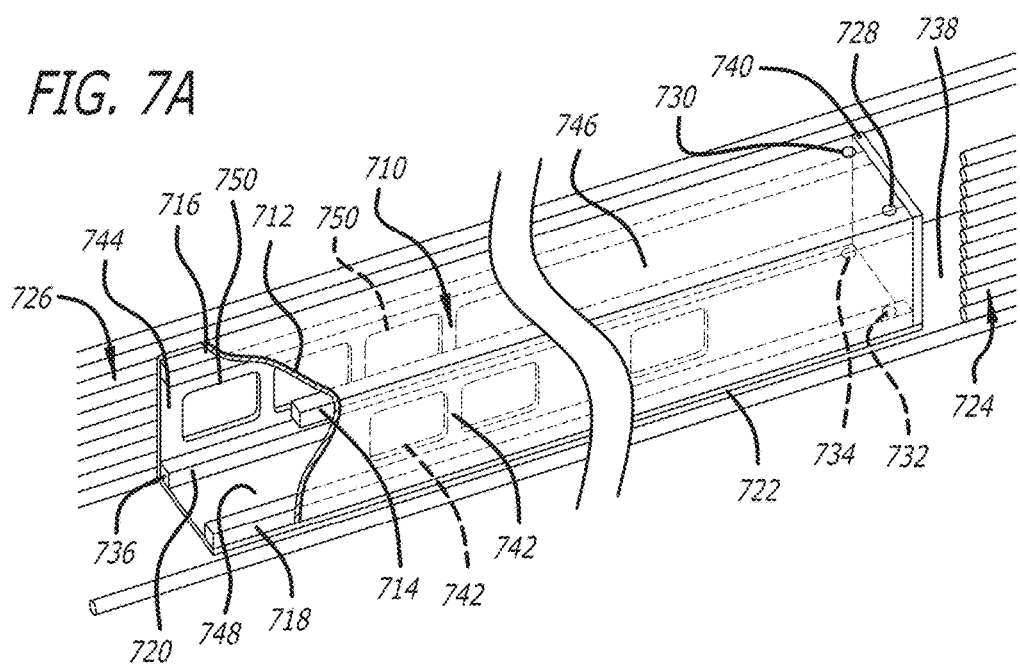
FIGS. 7A to 7C show different views of a launch tube and superconducting cable assemblies in accordance with one embodiment.
Figure 7B:
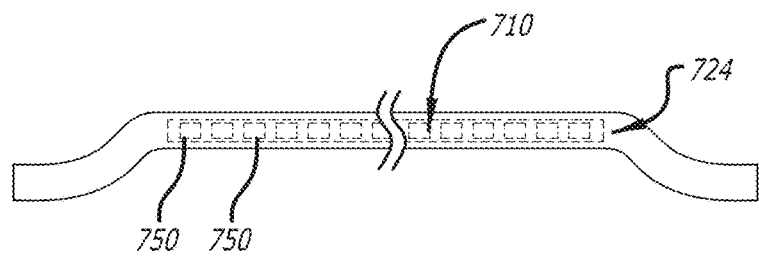
Figure 7C:
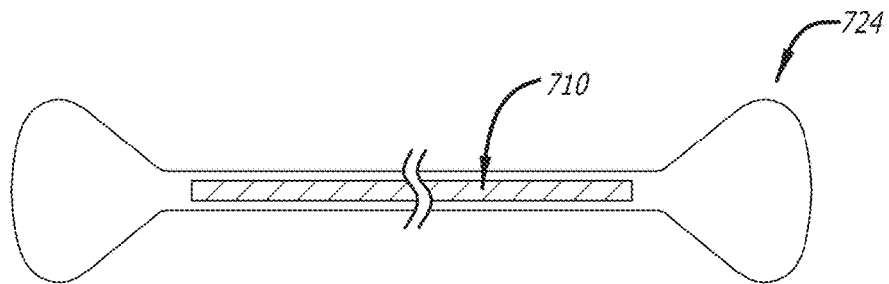
Figure 12:
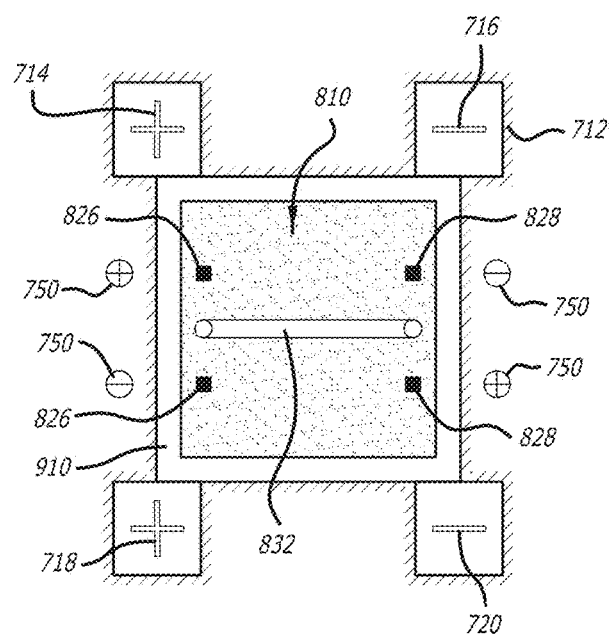
FIG. 12 shows a cross-sectional view of the position of horizontal and vertical stabilization loops on launch craft in accordance with another embodiment.

In one presently preferred aspect, current is supplied to upper left rail 714 and lower left rail 718 via positive electric terminals 728 and 732, respectively, from an external energy storage device capable of supplying direct current electric power to the rails. Upper right rail 716 and lower right rail 720 are connected to the ground of the external energy storage device by negative electric terminals 730 and 734, respectively. The external energy storage device could consist of batteries, a pulsed alternator, a superconducting magnetic energy storage system, or some other means. Current may also be separately supplied to rails 714 and 718 by a plurality of energy storage devices. Both the positive electric terminals 728 and 732 and the negative electrical terminals 730 and 734 are shown as connected to the starting end 738 of launch tube 710, though it is also possible, in other variants, for the electrical terminals to be located at the exit end 736 of launch tube 710. As is illustrated in FIGS. 7A, 7B and 12, a plurality of pairs of superconducting loops 750 that can be energized in addition to the left and right portions of the superconducting loop assembly 724, 726 may also be located on the left and right walls 742, 744 of the launch tube 710, as will be explained further below.

Figure 8A:
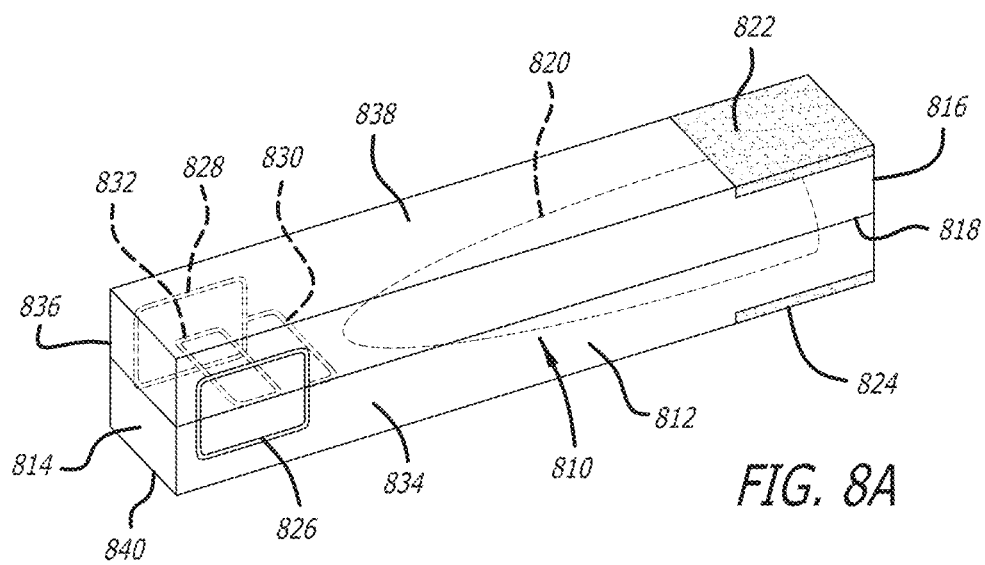
FIGS. 8A and 8B show views of a launch craft and its stabilization coils in accordance with another embodiment.
Figure 8B:
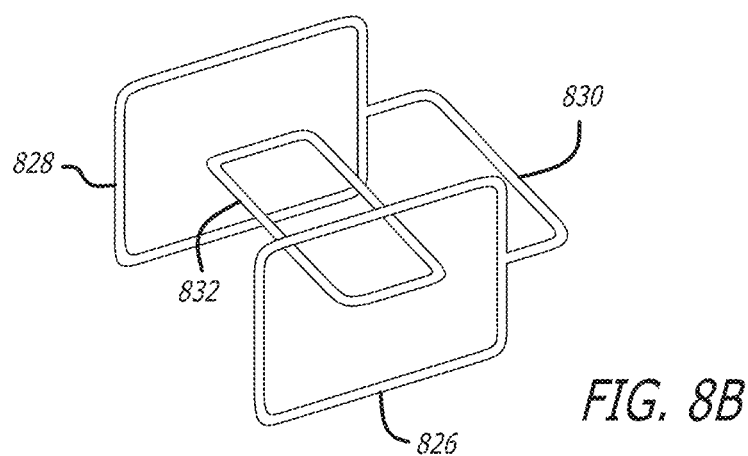

As illustrated in FIGS. 8A and 8B, launch craft 810 includes a sabot 812 which encloses a projectile 820. Projectile 820 can also be designed to contain a small rocket motor and spacecraft for transporting payloads into orbit. Sabot 812 also preferably at least partially frangible, and contains a parting line or fracture line 818, along which the sabot can separate from projectile 820 or other payload for launching the projectile or other payload after launch craft 810 exits launch tube 710. While launch craft 810 is shown in FIG. 8A with a square cross section, other shapes are also possible, including circular, elliptical, rectangular, and the like.

As shown in FIGS. 8A and 8B, sabot 812 has a square cross section that is 60 centimeters on a side and is of a pre-determined length sufficient to enclose projectile 820. Embedded into and flush with the top and bottom sides of sabot 812 are conducting metal plates 822 and 824, respectively, each of which can be made of ordinary conducting metal such as aluminum or copper, or some other conducting material. In one presently preferred aspect, plates 822 and 824 each are 60 centimeter in width (thus spanning the width of sabot 812), 30 cm in length along the long axis of the sabot, and are 1 cm thick, though other dimensions for plates 822 and 824 are possible. The conducting metal surfaces of the lateral ends of each conducting plate are exposed so that current may flow from one rail across the plate to another rail. The conducting plates are ideally located in the forward half of launch craft 810, though other configurations are possible. As an alternative to conducting plates 822 and 824 shown in FIG. 8A, conducting wires on or embedded into sabot 812 may also be used to carry current from one rail to another.

Launch craft 810 also preferably includes conducting loops 826 and 828 located on the left and right sides of the craft, respectively. Loops 826 and 828 are used for launch craft lateral stabilization. Loops 826 and 828 located forward of the conducting plates 822 and 824. Loops 826 and 828 are electrically interconnected by interconnection 830. The conducting loops 826 and 828, as well as interconnection 830, are made of an ordinary metal such as copper or aluminum of a predetermined cross-sectional area, though the use of other conductors is possible. Conducting loops 826 and 828 are embedded within or mounted to the sides of launch craft 810 in a simple rounded rectangular geometry, although other geometries are possible.

Launch craft 810, in another embodiment illustrated in FIG. 8B, also includes a horizontally planar conducting loop 832 embedded within the sabot 812 of the launch craft. Loop 832 is used for launch craft vertical levitation and stabilization. Loop 832 is located forward of conducting plates 822 and 824. Conducting loop 832 in this embodiment is made of an ordinary metal conductor such as copper or aluminum of a predetermined cross-sectional area. Conducting loop 832 is embedded within launch craft 810 in a simple planar and rectangular loop geometry. Conducting loop 832 can be made of other conductors as well. Another alternative embodiment may include multiple planar loops for vertical levitation and stabilization.

Figure 9:
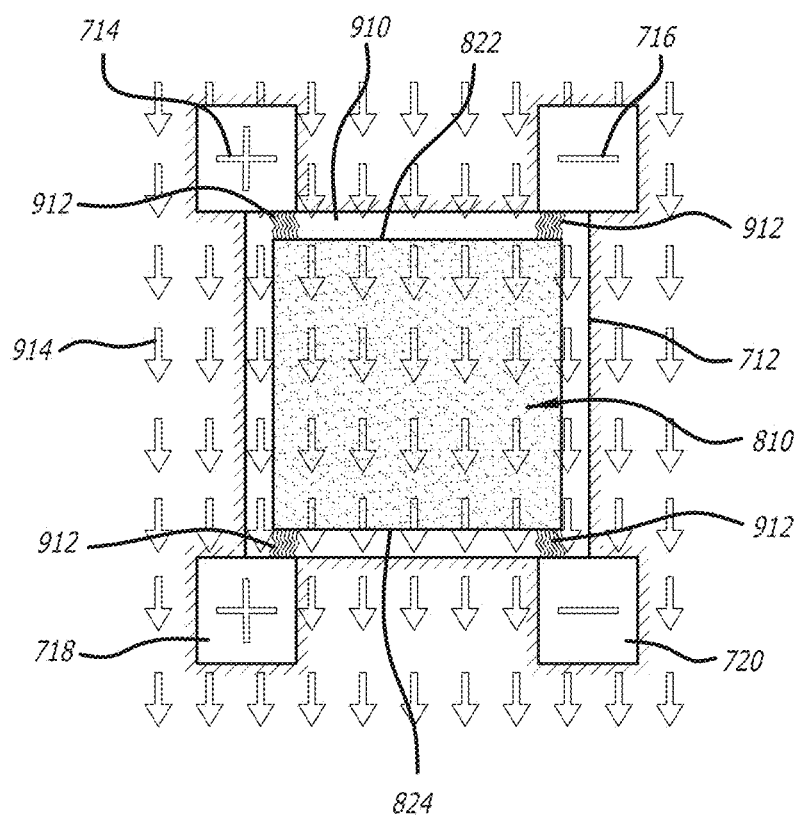
FIG. 9 shows a cross-section view of a launch craft within a launch tube immersed in an externally applied direct current magnetic field.
Figure 10A:
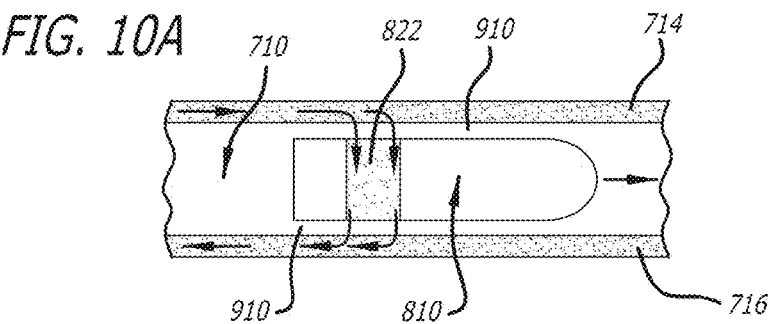
FIGS. 10A to 10E show current flowing along rails within a launch tube and various means to transmit current from rails to the conducting plate on a launch craft.
Figure 10B:
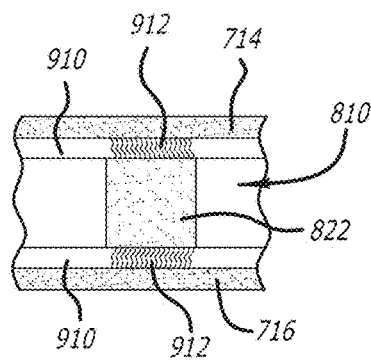
Figure 10C:
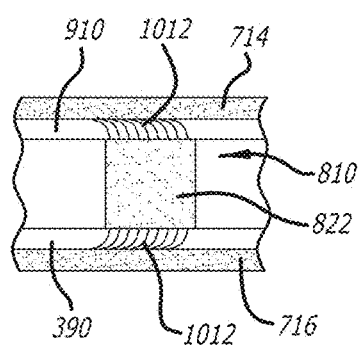
Figure 10D:
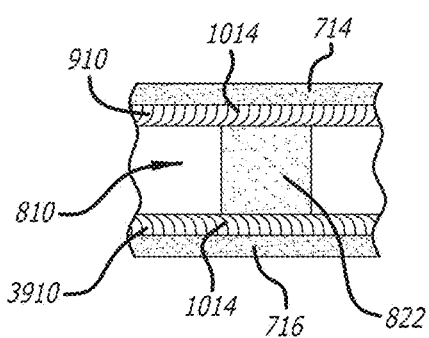
Figure 10E:
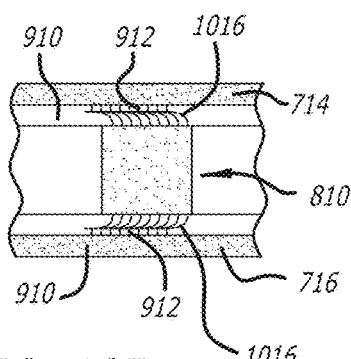

In another embodiment, as illustrated in FIG. 9, launch craft 810 is centered within launch tube 710 so that typically a 5 cm gap 910 is maintained between the launch craft 810 and launch tube wall 712. During operation, an electric arc 912 carries current across the gap between rails 714, 716, 718, and 720 and conducting plates 822 and 824. Furthermore, in its centered position, launch craft 810 is immersed within a transverse magnetic direct current field 914, the magnetic field lines of which are orthogonal to the long axis of launch tube 710. The magnetic field lines of field 914 flow from the top of the launch tube to the bottom. The transverse magnetic direct current field 914 is generated by superconducting loop assembly 724, 726 flanking the side walls of the launch tube. Although FIG. 9 illustrates current flow from rails 714, 716, 718, and 720 to the conducting plates 822 and 824 by means of an electric arc, it is also possible, as seen in FIG. 10, to conduct current by means of conducting brushes 1012 attached to sabot 812, which directly contact the rails, or by means of conducting brushes 1014 attached to rails 714, 716, 718, and 720, which directly contact sabot 812, or by means of conducting brushes 1016 on sabot 812, which do not directly contact the rails but instead narrow the gap between rail and conducting plates, and thereby aid in the formation of an electric arc.

In this alternate embodiment, the launch craft is accelerated along the launch tube by a Lorentz force generated by the interaction between the transverse magnetic DC field 914 and the current flowing through conducting plates 822 and 824 located on sabot 812. The DC dipole magnetic field inside launch tube 710 is generated by superconducting (SC) loop assembly 724. The SC cables 722 present in assembly 724, 726 run along the left and right sides of launch tube 710 to form a set of long loops that carry continuous, constant DC current. The left and right sides are connected at a sufficient distance from the ends of launch tube 710 so that the desired uniformity of field 914 is not affected. In another embodiment, current flows through the left side SC cables of assembly 724 in a direction from beginning 738 towards exit 736 of launch tube 710, and current flows through the right side SC cables of assembly 724 in a direction from exit 736 towards beginning 738 of launch tube 710. A transverse DC dipole magnetic field 914 is generated by current flowing in assembly 724, 726. Magnetic field 914 is orthogonal to the long axis of launch tube 710, with field lines flowing down from top to bottom through the launch tube. The strength of DC dipole magnetic field 914 generated by the assembly 724, 726 is constant in time during the launch process, both before launch craft 810 is accelerated, while it is being accelerated, and after it exits the launch tube 710. Depending on design, the superconducting cable assembly can be modified so that transverse DC dipole magnetic field 914 varies in strength spatially along the length of the launch tube.

In another embodiment, as illustrated in the cross-sectional view of the launch tube 710 shown in FIG. 9, current flows down the upper left rail 714 (into the paper), across the upper conducting plate 822, and returns along rail 716 (out of the paper). The interaction of the current flowing in rails 714 and 716 and conducting plate 822 with the transverse DC dipole magnetic field 914 generates a magnetic force that is in the direction into the paper. Similarly, current flows down the lower left rail 718 (into the paper), across the lower conducting plate 824, and returns along rail 720 (out of the paper). The interaction of the current flowing in rails 718 and 720 and conducting plate 824 with the transverse DC dipole magnetic field 914 generates a magnetic force that is in the direction into the paper.

The arrangement shown in FIG. 9 is arbitrary. If the directions of the currents in the superconducting loop assembly 714 were reversed, for example, the transverse DC dipole magnetic field would be upwards. Accordingly, current flows in rails 714, 716, 718, and 720 would modified so that the generated magnetic force would act to push launch craft 810 towards exit 736 of launch tube 710. The orientation of the embodiment shown in FIG. 7 can be rotated. Depending on design details, the transverse magnetic field can be at any angle with respect to Earth's gravity vector.

The total force exerted on launch craft 810 is then $$F = 2I \times B \times W \quad \text{Eq. 1}$$

Where
I=DC Current in the top or bottom plate, Amp
B=Strength of dipole DC magnetic field, Tesla
W=Width of conducting plate or wires across the sabot, meters
For
I=500,000 Amps
B=5 Tesla
W=0.6 meters
Applied to a 100 kg launch craft, the acceleration would be 3000 g.

Transfer of Current Along and Between Rails and Through Launch Craft:

As shown in the schematic FIGS. 10 and 11, current only flows out of the DC rails at the location of the accelerating launch craft. Note that the rails illustrated in FIGS. 10 and 11 have been drawn as displaced laterally from their actual position so that the flow of current can be visualized. In actuality, current only flows vertically between rail and conducting plate (as shown in FIG. 9) so that the plasma arc is not affected by the transverse field. As launch craft 810 moves along the launch tube, the DC current flows only across into sabot 812, and not at other locations across the full width of the launch tube due to the presence of a high vacuum in launch tube 710. The presence of a high vacuum ensures a very high electrical resistance across the full width of launch tube 710, preventing the formation of an electrical arc that directly spans the rails.

At the points where DC current flows from rails into the sabot, the electrical resistance is low. There are a number of possible arrangements that enable large DC currents to flow from the DC rails into and out of the moving sabot. These possible arrangements include the four arrangements shown in FIG. 10.

1. DC plasma arcs between the DC rails and the sabot conducting plate.
2. Flexible conducting brushes 1012 mounted to conducting plates 824 and 826 of sabot 812 conducting plate, which contact the DC rails.
3. Flexible conducting brushes 1014 mounted to the DC rails that contact conducting plates of 824 and 826 of sabot 812.
4. DC plasma arcs between DC rails and flexible conducting brushes 1016 mounted to conducting plates 822 and 824 on sabot 812.

Arrangement number 1 has the attractive feature that there is no mechanical contact between the rail and the sabot. Arrangement number 2 has the attractive feature that the conducting flexible brush on the sabot is only used once during the launch for a fraction of a second, and not for multiple launches. Arrangement number 4 has the attractive feature that there is no mechanical contact unless the sabot momentarily touches the DC rail due to a position anomaly (e.g., the displacement of a rail, etc.). In this event, the flexible conducting brush prevents any mechanical damage. In arrangement number 4, the plasma arc length is very small, typically less than 1 centimeter.

In one embodiment, the top rail pair, including rails 714 and 716, can operate independently of the bottom rail pair, including rails 718 and 720, with each pair connected to its own DC current power source. The DC current in the top pair can be controlled to be equal the DC current in the bottom pair, or different, depending on design. Alternatively, both rail pairs can be connected to the same power source.

Figure 11A:
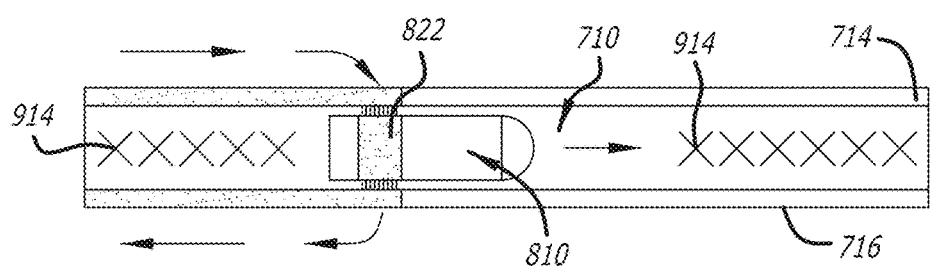
FIGS. 11A and 11B show current flow along rails and through the conducting plate at two time points in accordance with one embodiment.
Figure 11B:
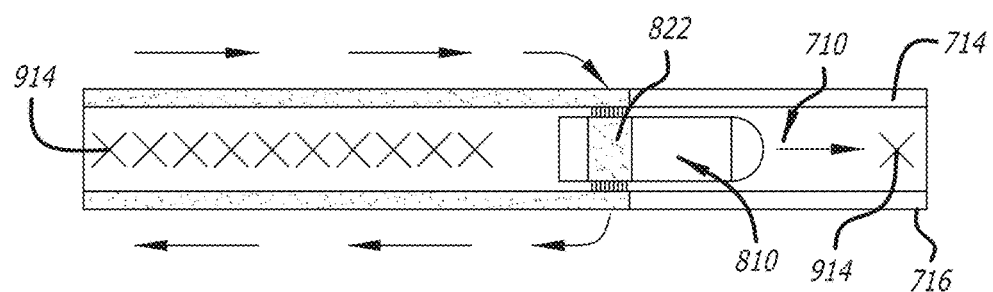

The DC rails 714, 716, 718, and 720 run the full length of the launch tube 710. At the starting end 738 of the launch tube, the ends of 714, 716, 718, and 720 are connected to the DC current/power source via electrical terminals 728, 730, 732, and 734, respectively. At the exit end 736 of launch tube 710, the rails are not electrically connected together. The DC current in the rail pair then flows from the DC current/power source out along one rail to the accelerating launch craft 810, where it flows into the conducting plate or wires on the moving launch craft, and then out of the conducting plate or wires to the other rail of the pair, in which it flows back to the DC current/power source. When the DC rail current begins to flow through launch craft 810, the launch craft accelerates along the launch tube with the length of the DC rail current path increasing as the distance of the launch craft from the start point increases, as shown in FIGS. 11A and 11B.

If the supplied DC rail current comes from an energy source located at the start 738 of launch tube 710, the conducting plates 822 and 824 on accelerating launch craft 810 would be located forward of the conducting loops 826, 828, and 832. This enables loops 826, 828, and 832 to interact with the currents in DC rails 714, 716, 718, and 720. If the DC rail current comes from an energy source located at exit 736 of the launch tube, loops 826, 828, and 832 would be located forward of conducting plates 822 and 824.

One advantage of locating the DC current power sources and their connectors to the rail pairs at the starting end 738 of launch tube 710 is that the launch process results in a lateral outwards force on the rails, pressing them against the wall of the launch tube.

Energy Losses During the Launch Process:

During the launch process, the energy losses ("$I^2R$ losses") in the normal conductor DC rails 714, 716, 718, and 720 are small compared to the kinetic energy imparted to the launch craft, and the corresponding temperature rise in the rails is very small.

As an example, a 100 kg launch craft launched at 8 kilometers per second typically has a kinetic energy of 3200 megajoules. The $I^2R$ losses in one of the DC rails during the acceleration process are only 20 megajoules, for an 8 inch square (20 cm×20 cm) copper rail carrying 500,000 amps. Total $I^2R$ losses for the four DC rails shown in FIG. 9 would be 80 megajoules, only 2.5% of the 3200 megajoules kinetic energy of the 100 kg launch craft. The temperature rise in DC copper rails would also be very small. For the example described above, the average temperature rise in the 20 cm×20 cm DC copper rails carrying 500,000 amps for up to 0.26 second would be only 0.3 degrees centigrade. The $I^2R$ energy losses in the conducting plates 822 and 824 of the sabot 812 that transfer the current from the positively charged DC rails to the negatively charged rails are much smaller even than the $I^2R$ energy losses in the DC rails.

In another embodiment, as shown in FIGS. 8A and 8B, if the dimensions of the conducting plates 822 and 824 on the top and bottom, respectively, of the accelerating sabot are 1 cm thick by 60 cm width across the width of the sabot and 30 cm long in the direction of travel, and they are made of aluminum and carry 500,000 amps, the $I^2R$ loss for each plate is only 0.36 megajoules during the 0.26 second acceleration phase to 8 kilometers per second launch velocity. The total $I^2R$ energy loss for the two conducting plates is then 0.7 megajoules, about 1/5000th of the launch craft's kinetic energy at 8 kilometers per second. The corresponding temperature rise is greater in the conducting plates (80° C.) than in the DC rails (0.3° C.) because of their smaller cross-sections, e.g., 30 cm² compared to 400 cm² for the DC rails, but is acceptable. Increasing the plate thickness to 1.5 centimeters would reduce the temperature rise by a factor of $(1.5)^2$, down to 35° C.

Levitation and Stabilization of the Launch Craft:

In another embodiment, launch craft 810 is magnetically levitated as it are magnetically accelerated along launch tube 710 so that the launch craft does not contact the walls of the launch tube. The levitated launch craft is inherently and automatically stabilized, both vertically and laterally, to keep the craft at its equilibrium levitated position inside the launch tube. If an external force were to act on the launch craft, pushing it vertically or laterally away from its equilibrium levitated position, an automatic, inherent magnetic force will oppose the external force, preventing the launch craft from contacting the wall of the launch tube.

The loops 826, 828, and 832 use normal metal conductor, e.g. aluminum, and operate at ambient temperature. Loop 832 carries a small current to levitate the launch craft during the less than one second acceleration period. Loops 826 and 828 carry no current when the launch craft is displaced from its centered position.

Vertical Levitation and Stabilization:

When loop 832 is vertically centered between a pair of energized superconducting loops 750 located on the left and right walls of launch tube 710, the net magnetic flux through the loop 832 is zero. As the launch craft moves in either up or down from the position where loop 832 is centered between the set of superconducting loops located on the wall of the launch tube, the net magnetic flux through loop 832 becomes non-zero, inducing a current in loop 832 that magnetically interacts with the currents in the superconducting cables, producing a force that pushes loop 832 and launch craft 810 back towards its centered position.

Because the launch craft has a non-zero weight, it will move downwards slightly until an upwards magnetic force that equals the weight of the vehicle is produced. The vehicle will then remain magnetically levitated. A downward movement of approximately 1 millimeter (0.1 cm) is sufficient to magnetically keep launch craft 810 levitated.

In the levitated state, the current in the left side of loop 832 (FIG. 12) flows in the same direction as the current in the top superconducting cable on the left launch tube wall, generating an upwards attractive magnetic force on the left side of loop 832, while the current in the bottom superconducting cable flows in the opposite direction, producing a repulsive upwards magnetic force on the conductor.

The same condition holds for the right side of loop 832 (FIG. 12). The current in the top superconducting cable on the right launch tube wall flows in the same direction as the current in the right conductor of loop 832, providing an upwards attractive magnetic force, while the current in the bottom superconducting cable on the wall provides a repulsive magnetic force, also pushing the launch craft upwards. The four magnetic forces on loop 832 sustain the weight of the launch craft.

Any external force that acts on the launch craft to try to move it vertically away up or down from its equilibrium levitated position is immediately countered by a change in the magnetic flux through loop 832, which changes the induced current in loop 832 to push it back towards its equilibrium levitated position. Depending on design, the vertical magnetic restoring force on the launch craft can be 10 g or more per centimeter of vertical displacement from its equilibrium levitation position.

Lateral Stabilization:

Lateral stability of launch craft 810 is provided by the dipole loops 826 and 828 on sabot 812 (FIGS. 8A and 8B). The left dipole loop 826 is connected to the right dipole loop 828 by interconnection 830 in a circuit that has zero magnetic flux through the circuit when the launch craft is centered between the set of superconducting loops on the left wall of the launch tube and the set of superconducting loops on the right wall of the launch tube.

If launch craft 810 moves toward the left wall of launch tube 710, a non-zero net magnetic flux develops in the circuit of loops 826 and 828, inducing a current that magnetically interacts with the superconducting cables in the walls of the launch tube to produce magnetic forces directed to the right, pushing the launch craft back towards its centered position. If the launch craft moves towards the right wall of the launch tube a non-zero magnetic flux develops in the circuit of loops 826 and 828, inducing a current that magnetically pushes the launch craft leftwards back toward its centered position.

Depending on design, the magnetic restoring force can be 10 g or more per centimeter of horizontal displacement from its centered position.

Superconducting Loops on Launch Tube:

The magnetic polarity of the superconducting cables alternates with the length of the launch tube, so that currents that are induced in loops 826, 828, and 832 do not resistively decay during the launch period. The superconducting cables can be configured as a series of separate individual loops that alternate in polarity along the launch tube, or they can periodically shift in vertical position. The top superconducting cable would move downwards to become the bottom cable, while the bottom cable would move upwards to become the top cable. The length for a given polarity would be on the order of a few tens meters, depending on design.

The current in the superconducting cables would typically be in the range of 200,000 to 300,000 amps.

The superconducting cables in the wall would be active in the section of the launch craft that did not have DC rail current above it. As illustrated in FIGS. 9 and 10, the current in the DC rails flows from the rail into the conducting plate or wires on the launch craft, magnetically accelerating it. In the section ahead of the conducting plate or wires on the launch craft, the current in the DC rails is zero. As a result, the induced currents in loop A and the B loops only magnetically interact with the currents in the superconducting cables, and do not interact with any rail current.

Figure 13:
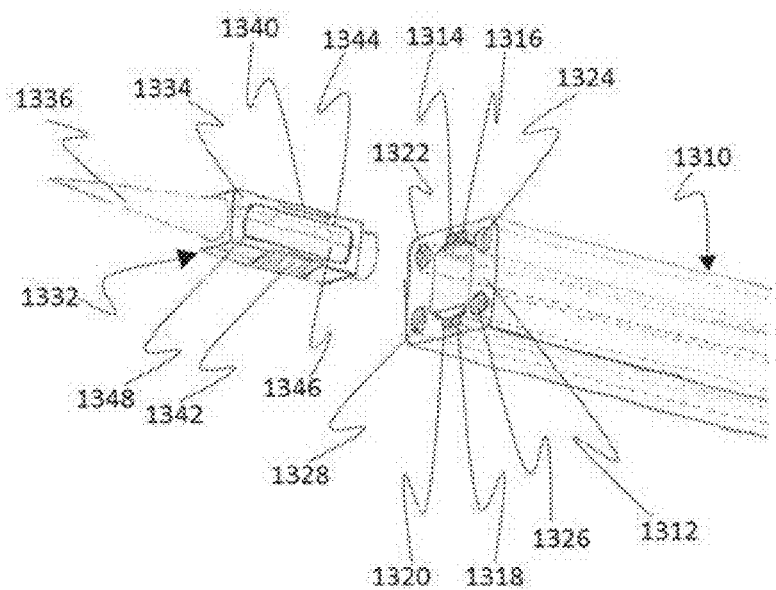
FIG. 13 shows a perspective view of a launch craft aligned with a cut-away section of a launcher in accordance with one embodiment.
Figure 14:
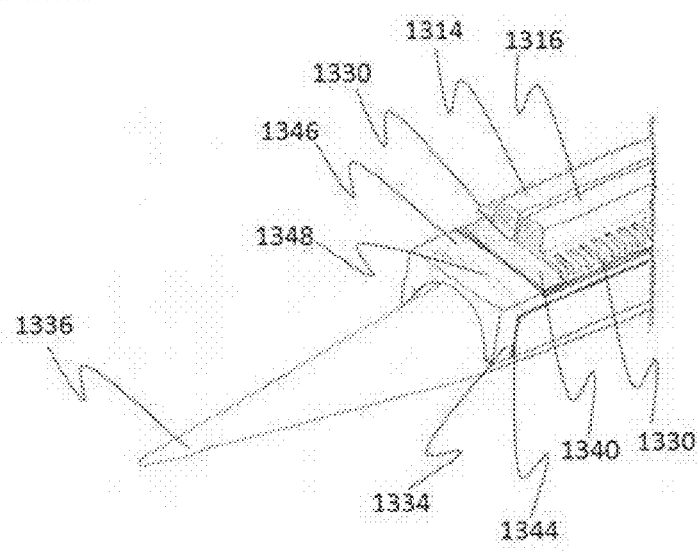
FIG. 14 shows a perspective view of certain selected components of the launch craft aligned with selected components of the launch tube in accordance with one embodiment.
Figure 15:
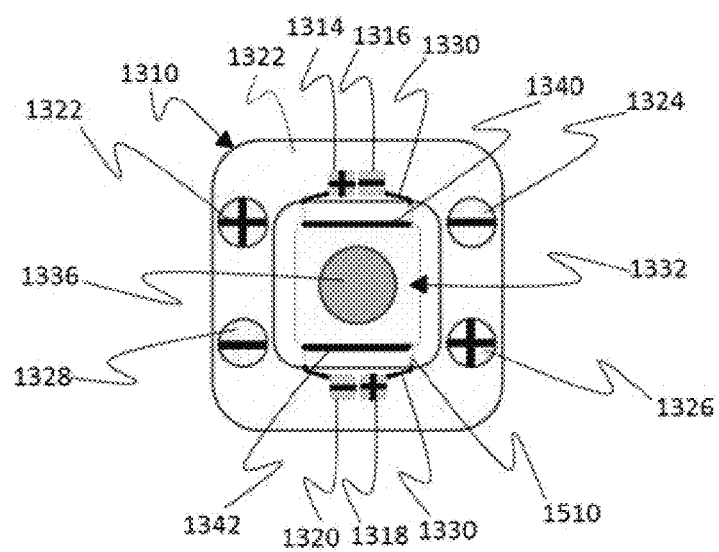
FIG. 15 shows a cross-section view of a launch craft within a launch tube with indicated current polarities in the cables and rails in accordance with one embodiment.

In an alternate embodiment, the electromagnetic launch system is similar to the embodiments already described, but differs in several key regards with respect to the composition of the launch tube, the launch craft, and also in the method of operation. The electromagnetic launch system preferably includes a launch tube 1310 and launch craft 1332, as illustrated in FIGS. 13,14, and 15, respectively.

Launch tube 1310 has a square cross-section, with a launch tube wall 1312 constructed of polymer concrete, non-conducting polymer or other material that is both non-conducting and sufficiently strong for the intended use. Launch tube 1310 can be closed at both ends to enable the air inside it to be removed.

Conducting rails 1314, 1316, 1318, and 1320 preferably are embedded in the launch tube walls to securely immobilize the rails during the launch process. The rails are made of copper or aluminum, or other material capable of carrying a predetermined current amperage. Rails 1314, 1316, 1318, and 1320 are placed so they run the length of launch tube 1310. Rails 1314 and 1316 form a pair embedded in the top wall of launch tube 1310 and run along the centerline of the top wall. Rails 1318 and 1320 form a pair embedded in the bottom wall of launch tube 1310 and run along the centerline of the bottom wall. A plurality of finger-like extensions 1330 that extend from the rails 1314, 1316, 1318, and 1320 towards the inside corners of launch tube 1310.

Embedded at predetermined locations within tube wall 1312 of launch tube 1310 are superconducting cables 1322, 1324, 1326, and 1328. Superconducting cables 1322 and 1324 are connected electrically to form an upper dipole loop that generates transverse magnetic direct current field of a predetermined uniformity at the level of upper thruster plate 1340. Superconducting cables 1326 and 1328 are connected electrically to form a lower dipole loop that generates transverse magnetic direct current field of a predetermined uniformity at the level of lower thruster plate 1342. In the present alternate embodiment, current flows in the opposite directions in the upper and lower dipole loops, creating a quadrupole magnetic field. However, the electromagnetic launch system can be constructed so that current flows in the same direction in the upper and lower dipole loops to form a dual dipole field within launch tube 1310.

In one presently preferred aspect, current is supplied to upper rail 1314 and lower rail 1318, respectively, from an external energy storage device capable of supplying direct current electric power to the rails. Upper rail 1316 and lower rail 1320 are connected to the ground of the external energy storage device, respectively. The external energy storage device could consist of batteries, a pulsed alternator, a superconducting magnetic energy storage system, or some other means. Current may also be separately supplied to rails 1314 and 1318 by a plurality of energy storage devices.

As illustrated in FIG. 13, launch craft 1332 includes a sabot 1334 which encloses a projectile 1336. Projectile 1336 can also be designed to contain a small rocket motor and spacecraft for transporting payloads into orbit. Sabot 1334 also preferably at least partially frangible, and contains a parting line or fracture line 1338, along which the sabot can separate from projectile 1336 or other payload for launching the projectile or other payload after launch craft 1332 exits launch tube 1310. While launch craft 1332 is shown in FIG. 15 with a square cross section, other shapes are also possible, including circular, elliptical, rectangular, and the like.

As shown in FIGS. 13 and 14, sabot 1334 has a square cross section that is 60 centimeters on a side and is of a pre-determined length sufficient to enclose projectile 1336.

Embedded into and flush with the top and bottom sides of sabot 1334 are conducting metal plates 1340 and 1342, respectively, each of which can be made of ordinary conducting metal such as aluminum or copper, or some other conducting material. In one presently preferred aspect, plates 1340 and 1342 each are 60 centimeter in width (thus spanning the width of sabot 812), 30 cm in length along the long axis of the sabot, and are 1 cm thick, though other dimensions for 1340 and 1342 are possible. The conducting metal surfaces of the lateral ends of each conducting plate are exposed so that current may flow from one rail's finger extensions across the plate to another rail's finger extensions. The conducting plates are ideally located in the middle of launch craft 1332, near its center of balance, though other configurations are possible. As an alternative to conducting plates 1340 and 1342 shown in FIG. 13, conducting wires on or embedded into sabot 812 may also be used to carry current from one rail to another.

Launch craft 1332 also preferably includes conducting loops 1344 and 1346 located on the left and right sides of the craft, respectively. Loops 1344 and 1346 are used for launch craft lateral stabilization. Loops 1344 and 1346 are electrically interconnected by interconnection 1348. The conducting loops 1344 and 1346, as well as interconnection 1348, are made of an ordinary metal such as copper or aluminum of a predetermined cross-sectional area, though the use of other conductors is possible. Conducting loops 1344 and 1346 are embedded within or mounted to the sides of launch craft 1332 in a simple rounded rectangular geometry, although other geometries are possible.

In one embodiment, as illustrated in FIG. 14, launch craft 1332 is centered within launch tube 1310 so that typically a 5 cm gap is maintained between the launch craft 1310 and launch tube wall 1312. During operation, a plasma arc 1510 carries current across the gap between the rails 1314, 1316, 1318, and 1320 and conducting plates 1340 and 1342. Furthermore, in its centered position, upper plate 1340 is immersed within a transverse magnetic direct current field, the magnetic field lines of which are orthogonal to the long axis of launch tube 1310. The transverse magnetic direct current field interacting with thruster plate 1340 is generated by superconducting loop cables 1322 and 1324 embedded in launch tube walls 1312. Similarly, in its centered position, lower plate 1342 is immersed within a transverse magnetic direct current field, the magnetic field lines of which are orthogonal to the long axis of launch tube 1310. The transverse magnetic direct current field interacting with thruster plate 1342 is generated by superconducting loop cables 1326 and 1328 embedded in launch tube walls 1312. Although FIG. 15 illustrates current flow from rails 1314, 1316, 1318, and 1320 to the conducting plates 1340 and 1342 by means of a plasma arc 1510, it is also possible, to conduct current by means of conducting brushes attached to sabot 1334, which directly contact the rails, or by means of conducting brushes attached to rails 1314, 1316, 1318, and 1320, which directly contact sabot 1334.

In this alternate embodiment, the launch craft is accelerated along the launch tube by a Lorentz force generated by the interaction between the transverse magnetic DC field and the current flowing through conducting plates 1340 and 1342 located on sabot 1334. The two DC dipole magnetic fields inside launch tube 1310 are generated by superconducting cables 1322, 1324, 1326, 1328. At the level of the thruster plates 1340 and 1342, the generated magnetic fields are orthogonal to the long axis of launch tube 1310, with field lines flowing down from top to bottom through the launch tube. The strength of DC dipole magnetic fields generated by the superconducting cables 1322, 1324, 1326, 1328 is constant in time during the launch process, both before launch craft 1332 is accelerated, while it is being accelerated, and after it exits the launch tube 1310.

In another embodiment, as illustrated in the cross-sectional view of the launch tube 1310 shown in FIG. 15, current flows along the upper left rail 1314 (into the paper), along a finger extension 1330 at the location of the launch craft, across the air gap via a plasma arc 1510, down through a flexible conductive brush 1520, across the upper conducting plate 1340, up through a flexible conductive brush 1520, across the airgap via a plasma arc 1510, along a finger extension 1330, and returns along rail 1316 (out of the paper). Similarly, current flows along the lower right rail 1326 (into the paper), along a finger extension 1330 at the location of the launch craft, across the air gap via a plasma arc 1510, up through a flexible conductive brush 1520, across the lower conducting plate 1342, down through a flexible conductive brush 1520, across the airgap via a plasma arc 1510, along a finger extension 1330, and returns along rail 1316 (out of the paper).

The total force exerted on launch craft 1332 is then $$F = 2I \times B \times W \qquad \text{Eq. 1}$$

Where
I=DC Current in the top or bottom plate, Amp
B=Strength of dipole DC magnetic field, Tesla
W=Width of conducting plate or wires across the sabot, meters
For
I=500,000 Amps
B=5 Tesla
W=0.6 meters
Applied to a 100 kg launch craft, the acceleration would be 3000 g.

Transfer of Current Along and Between Rails and Through Launch Craft:

Current only flows out of the DC rails at the location of the accelerating launch craft. As shown in FIGS. 14 and 15, current only flows vertically between rail finger extension 1330 and thruster plate 1340 or 1342 so that the plasma arc is not affected by the transverse magnetic field. As launch craft 1332 moves along the launch tube, the DC current flows only across into sabot 1334, and not at other locations across the full width of the launch tube due to the presence of a high vacuum in launch tube 1310. The presence of a high vacuum ensures a very high electrical resistance across the full width of launch tube 1310, preventing the formation of an plasma arc that directly spans the finger extensions of the rails.

Levitation and Stabilization of the Launch Craft:

In another embodiment, launch craft 1332 is magnetically levitated as it is magnetically accelerated along launch tube 1310 so that the launch craft does not contact the walls of the launch tube. The levitated launch craft is inherently and automatically stabilized, both vertically and laterally, to keep the craft at its equilibrium levitated position inside the launch tube. If an external force were to act on the launch craft, pushing it vertically or laterally away from its equilibrium levitated position, an automatic, inherent magnetic force will oppose the external force, preventing the launch craft from contacting the wall of the launch tube.

Vertical Levitation and Stabilization:

A virtual vertical levitation loop is formed on the top and bottom sides of launch craft 1332. On the top side of launch craft 1332, this virtual levitation loop is formed by the current path flowing from upper positive rail 1314, along a rail finger extension 1330, across the air gap by means of a plasma arc 1510, across upper thruster plate 1340, back across the air gap by another plasma arc 1510, back along a rail finger extension 1330, and finally back down upper negative rail 1316. On the bottom side of launch craft 1332, this virtual levitation loop is formed by the current path flowing from lower positive rail 1318, along a rail finger extension 1330, across the air gap by means of a plasma arc 1510, across lower thruster plate 1342, back across the air gap by another plasma arc 1510, back along a rail finger extension 1330, and finally back down lower negative rail 1320. Each of these virtual levitation loops are akin to a circular current path where the generated magnetic field applies a hoop stress to the loop, seeking to push launch craft 1332 away from the wall. As the launch craft deviates from its central vertical position, the force pushing the launch craft towards the center coming from the closer wall automatically becomes stronger and the force on the opposite side becomes weaker. The balance of forces always seeks to push launch craft 1332 towards its vertical equilibrium point.

Lateral Stabilization:

Lateral stability of launch craft 1332 is provided by the dipole loops 1344 and 1346 located on the port and starboard sides sabot 1334. The port dipole loop 1344 is connected to the starboard dipole loop 1346 by interconnection 1348 in a circuit that has zero magnetic flux through the circuit when the launch craft is laterally centered in launch tube 1310.

If launch craft 1332 moves toward the left wall of launch tube 1310, a non-zero net magnetic flux develops in the circuit of loops 1346 and 1348, inducing a current that magnetically interacts with the fields generated by superconducting cables 1322, 1324, 1326, and 1328 in the walls of the launch tube to produce magnetic forces directed to the right, pushing the launch craft back towards its centered position. Similarly, if the launch craft moves towards the right wall of the launch tube a non-zero magnetic flux develops in the circuit of loops 1346 and 1348, inducing a current that magnetically pushes the launch craft leftwards back toward its centered position.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. An electromagnetic launcher for launching a launch craft, comprising:
   a launch tube including a launch tube wall, said launch tube being configured to permit a launch craft to travel through said launch tube;
   a plurality of electrically conducting rails mounted to said launch tube wall;

a means for applying a transverse direct current magnetic field to said launch tube and contents of said launch tube;

a means for magnetically levitating and stabilizing said launch craft to minimize contact between said launch craft and said launch tube as the launch craft travels within said launch tube; and a means for transmitting an electrical current passed from one of said electrically conducting rails across said launch craft to another of said electrically conducting rails in the presence of said magnetic field, in order to accelerate said launch craft inside said launch tube.

2. The electromagnetic launcher of claim 1 wherein said means for applying a transverse direct current magnetic field comprises a plurality of electrically conducting cables arranged in an assembly on at least one side of said launch tube.

3. The electromagnetic launcher of claim 1 wherein said means for applying a transverse direct current magnetic field includes a plurality of electrically conducting cables embedded in the walls of said launch tube.

4. The electromagnetic launcher of claim 1 wherein said launch tube has a square cross section with four interior corner edges, and said plurality of electrically conducting rails comprises four electrically conducting rails mounted along each of said four interior corner edges of said launch tube.

5. The electromagnetic launcher of claim 4 wherein said electrically conducting rails comprises two pairs of non-connected rails, each of said pairs of non-connected rails including a positive rail connected to a positive terminal of a current source and a negative rail connected to a negative terminal of said current source.

6. The electromagnetic launcher of claim 1 wherein said launch tube has a square cross section with one pair of electrically conducting rails is mounted in one wall of said launch tube, and a second pair of electrically conducting rails is mounted in the opposite wall of said launch tube.

7. The electromagnetic launcher of claim 6 wherein said rail pairs each consist of two electrically conducting rails lain close side by side flanking the wall's centerline and collinear with said launch tube while remaining electrically insulated from each other.

8. The electromagnetic launcher of claim 7 wherein said rails include separated, finger-like extensions that extend from said rails to a location away from said rails.

9. The electromagnetic launcher of claim 1 wherein the launch craft includes a surface including a plurality of closed conducting loops configured to magnetically interact with current flowing in said electrically conducting rails to vertically levitate and stabilize the launch craft in a desired position as the launch craft travels down said launch tube.

10. The electromagnetic launcher of claim 9 wherein said plurality of closed conducting loops comprises a pair of superconducting planar loops integrated the surface of the launch craft on opposite sides of the launch craft.

11. The electromagnetic launcher of claim 1 wherein the launch craft comprises a surface including a plurality of closed conducting loops disposed on a plurality of surfaces of the launch craft and configured to magnetically interact with current flowing in said electrically conducting rails to laterally stabilize the launch craft in a desired position as it travels down said launch tube.

12. The electromagnetic launcher of claim 11 wherein said plurality of closed conducting loops comprises a pair of superconducting loops formed into a figure of 8 geometry and integrated into a surface of the launch craft on opposite sides of the launch craft.

13. The electromagnetic launcher of claim 1 wherein said means for magnetically levitating and stabilizing said launch craft comprises a plurality of superconducting loops integrated into said launch tube wall.

14. The electromagnetic launcher of claim 13 wherein the launch craft includes a plurality of closed conducting loops integrated into a surface of the launch craft and configured to magnetically interact with said superconducting loops.

15. The electromagnetic launcher of claim 14 wherein said plurality of closed conducting loops integrated into the surface of the launch craft comprises a simple planar loop extending in a horizontal plane through the body of said launch craft.

16. The electromagnetic launcher of claim 13 wherein the launch craft includes a plurality of closed conducting loops integrated into a plurality of surfaces of the launch craft and configured to magnetically interact with said plurality of superconducting loops.

17. The electromagnetic launcher of claim 16 wherein said plurality of closed conducting loops on the plurality of surfaces of the launch craft comprises two interconnected planar loops integrated into opposing surfaces of the launch craft.

18. The electromagnetic launcher of claim 1 wherein the means for transmitting an electrical current comprises a plurality of conducting plates integrated into the body of the launch craft, said plurality of conducting plates being configured to provide at least part of a current path from a positively charged rail to a negatively charged rail.

19. The electromagnetic launcher of claim 1 wherein the means for transmitting an electrical current comprises a plurality of conducting wires integrated into the launch craft, said plurality of conducting wires being configured to provide at least part of a current path from a positively charged rail to a negatively charged rail.

20. The electromagnetic launcher of claim 1 wherein the means for transmitting an electrical current comprises a plasma arc between said plurality of electrically conducting rails and the launch craft, to allow current to flow between said electrically conducting rails and the launch craft.

21. The electromagnetic launcher of claim 1 wherein the means for transmitting an electrical current comprises a plurality of flexible conducting brushes attached to the launch craft, said plurality of flexible conducting brushes being configured to directly contact said electrically conducting rails, to allow current to flow between said electrically conducting rails and the launch craft.

22. The electromagnetic launcher of claim 1 wherein the means for transmitting an electrical current comprises a plurality of flexible conducting brushes attached to said electrically conducting rails, said plurality of flexible conducting brushes being configured to directly contact the launch craft, to allow current to flow between said electrically conducting rails and said launch craft.

23. The electromagnetic launcher of claim 1 wherein said means of magnetically levitating and stabilizing said launch craft include the use of a plurality of electrical current paths in a predetermined geometry formed by current flowing through components of said launch tube and said launch craft that stabilize the launch craft in a desired position as it travels down said launch tube.

24. The electromagnetic launcher of claim 23 wherein a plurality of said electrical current paths create a plurality of magnetic pressures which are balanced to produce zero net force when said launch craft is at a desired position.

25. A system for electromagnetically launching a launch craft, comprising:
a launch tube including launch tube walls, said launch tube including a plurality of electrically conducting rails mounted along a length of said launch tube walls;
a plurality of electrically superconducting loops arranged in an assembly flanking said launch tube and configured to apply a transverse direct current magnetic field to said launch tube and contents of said launch tube;
a launch craft configured to be removably received in said launch tube, said launch craft including a sabot for carrying a payload;
a plurality of conductors located on said sabot, said plurality of conductors being configured to provide at least a portion of a current path from a positively charged one of said plurality of electrically conducting rails to a negatively charged one of said plurality of rails to transmit electrical current across said sabot in the presence of said transverse direct current magnetic field to accelerate said launch craft inside said launch tube; and
a plurality of closed conducting loops in a predetermined geometry located on said sabot, said plurality of closed conducting loops being configured to interact with current in said plurality of electrically conducting rails to magnetically levitate and vertically stabilize said launch craft to minimize contact between said launch craft and said launch tube as said launch craft travels within said launch tube.

26. The system of claim 25, wherein said sabot comprises a frangible portion by which the sabot is configured to separate from the payload for launching the payload.

27. The system of claim 25, wherein said plurality of conductors located on said sabot comprises a pair of upper and lower conducting metal plates.

28. The system of claim 25, wherein said plurality of closed conducting loops comprises conducting loops located on left and right sides of said sabot.

29. The system of claim 25, wherein said plurality of closed conducting loops comprises upper and lower figure of 8 conducting loops.

30. The system of claim 25, wherein said plurality of closed conducting loops comprises two interconnected planar loops integrated into opposite surfaces of said sabot.

31. The system of claim 25, wherein said plurality of conductors comprises a plurality of flexible conducting brushes attached to said sabot and configured to directly contact said electrically conducting rails for carrying current between said electrically conducting rails and said launch craft.

32. The system of claim 25, wherein said plurality of conductors comprises a plurality of flexible conducting brushes attached to said electrically conducting rails and configured to directly contact said electrically conducting rails for carrying current between said electrically conducting rails and said launch craft.

33. A method for electromagnetically launching a launch craft, comprising the steps of:
providing a launch tube including launch tube walls, said launch tube including a plurality of electrically conducting rails mounted along a length of said launch tube walls;
a plurality of electrically superconducting loops arranged in an assembly flanking said launch tube and configured to apply a transverse direct current magnetic field to said launch tube and contents of said launch tube;
providing a launch craft configured to be removably received in said launch tube, said launch craft including a sabot for carrying a payload;
providing a plurality of conductors located on said sabot, said to plurality of conductors being configured to provide at least a portion of a current path from a positively charged one of said plurality of rails to a negatively charged one of said plurality of rails to transmit an electrical current across said sabot in the presence of said transverse direct current magnetic field to accelerate said launch craft inside said launch tube;
providing a plurality of closed conducting loops in a predetermined geometry located on said sabot, said plurality of loops of conducting material being configured to interact with current in said plurality of electrically conducting rails to magnetically levitate and vertically stabilize said launch craft to minimize contact between said launch craft and said launch tube as said launch craft travels within said launch tube;
applying a transverse direct current magnetic field to the launch tube and the launch craft during launching of the launch craft;
magnetically levitating and stabilizing said launch craft to minimize contact between said launch craft and said launch tube as said launch craft travels within said launch tube; and
transmitting the electrical current to conducting plates integrated into said launch craft to provide part of a current path from a positively charged rail to a negatively charged rail.

34. The method of claim 33, wherein said step of applying a transverse direct current magnetic field comprises applying said transverse direct current magnetic field by a plurality of electrically conducting cables arranged in an assembly flanking said launch tube.

35. The method of claim 33, wherein said step of transmitting the electrical current comprises transmitting the electrical current in the presence of said transverse direct current magnetic field to accelerate said launch craft inside said launch tube.

36. The method of claim 33, wherein said step of transmitting the electrical current comprises transmitting the electrical current to conducting wires integrated into said launch craft to provide part of a current path from the positively charged rail to the negatively charged rail.

37. The method of claim 33, wherein said step of transmitting the electrical current comprises transmitting the electrical current via a plasma arc between said electrically conducting rails and said launch craft.

38. The method of claim 33, wherein said step of transmitting the electrical current comprises transmitting the electrical current to flexible conducting brushes attached to said launch craft to provide part of a current path from a positively charged rail to a negatively charged rail.

39. The method of claim 33, wherein said step of transmitting the electrical current comprises transmitting said electrical current to flexible conducting brushes attached to said electrically conducting rails which directly contact said launch craft to provide part of the current path from a positively charged rail to a negatively charged rail.

* * * * *